(12) United States Patent
Matsumura et al.

(10) Patent No.: US 12,160,833 B2
(45) Date of Patent: Dec. 3, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 333 days.

(21) Appl. No.: 17/756,287

(22) PCT Filed: Nov. 10, 2020

(86) PCT No.: PCT/JP2020/041792
§ 371 (c)(1),
(2) Date: May 20, 2022

(87) PCT Pub. No.: WO2021/100531
PCT Pub. Date: May 27, 2021

(65) Prior Publication Data
US 2023/0032909 A1    Feb. 2, 2023

(30) Foreign Application Priority Data
Nov. 21, 2019  (JP) ................................. 2019-210877

(51) Int. Cl.
*H04W 52/24*    (2009.01)

(52) U.S. Cl.
CPC ................................ *H04W 52/242* (2013.01)

(58) Field of Classification Search
CPC .... H04W 52/242; H04W 72/04; H04L 5/0048
See application file for complete search history.

(56) References Cited

U.S. PATENT DOCUMENTS

| | | | |
|---|---|---|---|
| 2019/0261320 A1* | 8/2019 | Yu | H04W 56/001 |
| 2021/0084640 A1* | 3/2021 | Kang | H04L 5/0048 |
| 2021/0105805 A1* | 4/2021 | Venugopal | H04L 25/0226 |
| 2021/0160905 A1* | 5/2021 | Liou | H04W 72/046 |
| 2022/0279450 A1* | 9/2022 | Zhang | H04B 7/0695 |
| 2022/0345903 A1* | 10/2022 | Liu | H04L 5/0053 |

OTHER PUBLICATIONS

3GPP TSG RAN WG1 #99; R1-1911844 "Discussion on Multi-beam Operation Enhancements" OPPO; Reno, USA; Nov. 18-22, 2019 (13 pages).

(Continued)

*Primary Examiner* — Angelica Perez
(74) *Attorney, Agent, or Firm* — Osha Bergman Watanabe & Burton LLP

(57) ABSTRACT

A terminal according to one aspect of the present disclosure includes: a receiving section that receives configuration information on uplink transmission of one of a physical uplink control channel (PUCCH) and a sounding reference signal (SRS), the configuration information not including spatial relation information and information on a reference signal for pathloss reference; and a control section that uses a reference signal in an active transmission control indication (TCI) state having a lowest ID with respect to a physical downlink shared channel (PDSCH) for pathloss calculation for the uplink transmission.

4 Claims, 7 Drawing Sheets

(56) References Cited

OTHER PUBLICATIONS

3GPP TSG RAN WG1 Meeting #99; R1-1912277 "Feature lead summary of Enhancements on Multi-beam Operations" LG Electronics; Reno, USA; Nov. 18-22, 2019 (34 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2020/041792, mailed Dec. 28, 2020 (3 pages).
Written Opinion issued in International Application No. PCT/JP2020/041792; Dated Dec. 28, 2020 (4 pages).
Office Action issued in Japanese Application No. 2021558307, dated May 14, 2024 (6 pages).
3GPP TSG-RAN WG1 Meeting #98; R1-1911127 "Enhancements on Multi-beam Operation" Qualcomm Incoprorated; Chongqing, China, Oct. 14-20, 2019 (22 pages).
3GPP TSG RAN WG1 Meeting #99; R1-1911931 "Enhancements on Multi-beam Operation" ZTE; Reno, USA, Nov. 18-22, 2019 (18 pages).

* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a future radio communication system (NR, for example), consideration is given to causing a user terminal (terminal, user equipment (UE)) to control transmitting/receiving processing on the basis of information related to quasi-co-location (QCL) information.

However, it is not clearly known how to determine a reference signal (RS) for at least one of QCL and pathloss calculation in reception of a downlink (DL) signal or transmission of an uplink (UL) signal. Unless the UE determines an appropriate reference signal, reduction in system performance such as throughput reduction may be caused.

Thus, one object of the present disclosure is to provide a terminal and a radio communication method that determine a reference signal for at least one of QCL and pathloss calculation appropriately.

Solution to Problem

A terminal according to one aspect of the present disclosure includes: a receiving section that receives configuration information on uplink transmission of one of a physical uplink control channel (PUCCH) and a sounding reference signal (SRS), the configuration information not including spatial relation information and information on a reference signal for pathloss reference; and a control section that uses a reference signal in an active transmission control indication (TCI) state having a lowest ID with respect to a physical downlink shared channel (PDSCH) for pathloss calculation for the uplink transmission.

Advantageous Effects of Invention

According to one aspect of the present disclosure, a reference signal for at least one of QCL and pathloss calculation can be determined appropriately.

Figure 1:
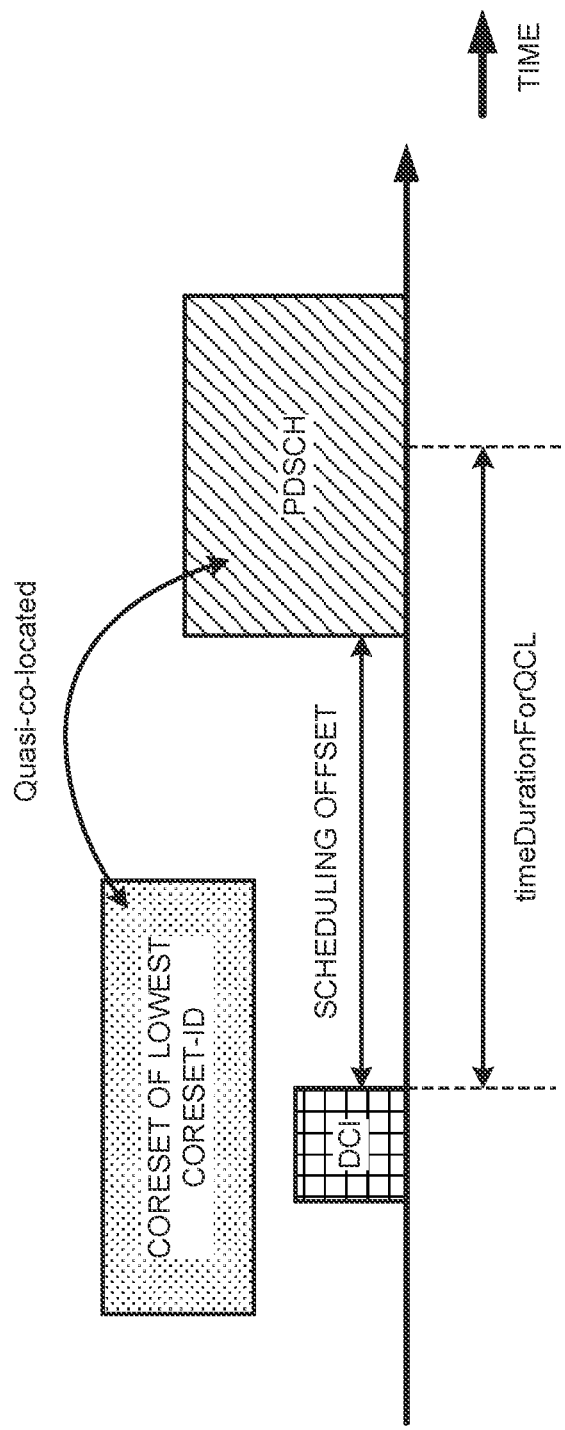
FIG. 1 is a diagram to show an example of QCL assumption of a PDSCH.

DESCRIPTION OF EMBODIMENTS (Transmission Power Control)
<Transmission Power Control for PUSCH>

According to NR, transmission power for a PUSCH is controlled on the basis of a TPC command (also referred to as a value, an increase/reduction value, a correction value, and so on) indicated by a value of a certain field (also referred to as a TPC command field, and so on) in DCI.

For example, if UE is to transmit a PUSCH on active UL BWP b of a carrier f of a serving cell c using a parameter set having an index j (open-loop parameter set) and an index l to a power control adjustment state (PUSCH power control adjustment state), transmission power for the PUSCH ($P_{PUSCH,b,f,c}(i,j,q_d,l)$) in a PUSCH transmission occasion (also referred to as a transmission period, and so on) i may be expressed by following Equation (1). The power control adjustment state may be referred to as a value based on a TPC command of the power control adjustment state index l, a cumulative value of the TPC command, or a value determined by a closed loop. Regarding l, it may be referred to as a closed loop index.

The PUSCH transmission occasion i is a period of transmission of the PUSCH and may be configured using one or more symbols or one or more slots, for example.

[Math. 1]

Equation (1)

$$P_{PUSCH,b,f,c}(i, j, q_d, l) = $$
$$\min\begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}[dBm]$$

Here, $P_{CMAX,f,c(i)}$ is transmission power for a user terminal (also referred to as maximum transmission power, UE maximum output power, and so on) configured for the carrier f of the serving cell c in the transmission occasion i, for example. Regarding $P_{O\_PUSCH,b,f,c}(j)$, it is a parameter (also referred to as a parameter related to transmission power offset, transmission power offset P0, a target reception power parameter, and so on) for target reception power configured for the active UL BWP b of the carrier f of the serving cell c in the transmission occasion i, for example.

Regarding $M^{PUSH}_{RB,b,f,c}(i)$, it is the number of resource blocks (bandwidths) allocated to a PUSCH for the transmission occasion i in the active UL BWP b of the carrier f of the serving cell c and a subcarrier spacing p, for example. Regarding $\alpha_{b,f,c}(j)$, it is a value provided from a higher layer parameter (also referred to as msg3-Alpha, p0-PUSCH-Alpha, a fractional factor, and the like, for example).

Regarding $PL_{b,f,c}(q_d)$, it is pathloss (pathloss estimate [dB], pathloss compensation) calculated by a user terminal using an index $q_d$ to a reference signal (RS) (a pathloss reference RS, an RS for pathloss reference, a DL-RS for pathloss measurement, PUSCH-PathlossReferenceRS) for downlink BWP associated with the active UL BWP b of the carrier f of the serving cell c, for example.

If the UE is not provided with a pathloss reference RS (e.g., PUSCH-PathlossReferenceRS) or if the UE is not provided with a dedicated higher layer parameter, the UE may calculate $PL_{b,f,c}(q_d)$ using an RS resource from a synchronization signal (SS)/physical broadcast channel (PBCH) block (SS block (SSB)) used for obtaining a master information block (MIB).

If the UE is configured with RS resource indexes of a number corresponding to a value up to a maximum number of pathloss reference RSs (for example, maxNrofPUSCH-PathlossReferenceRSs) and a set of RS settings for respective RS resource indexes using the pathloss reference RSs, the set of the RS resource indexes may include one or both of an SS/PBCH block index set and a channel state information (CSI)-reference signal (RS) resource index set. The UE may identify an RS resource index $q_d$ in the RS resource index set.

If PUSCH transmission is scheduled by random access response (RAR) UL grant, the UE may use the RS resource index $q_d$ same as that for corresponding PRACH transmission.

If the UE is provided with configuration of power control over a PUSCH using a sounding reference signal (SRS) resource indicator (SRI) (for example, SRI-PUSCH-Power-Control) and is provided with a value of the pathloss reference RS that is equal to or greater than 1, the UE may obtain mapping between a set of values for an SRI field in DCI format 0_1 and a set of ID values of the pathloss reference RS from higher layer signaling (for example, sri-PUSCH-PowerControl-Id in SRI-PUSCH-PowerControl). The UE may determine the RS resource index $q_d$ using an ID of the pathloss reference RS mapped on an SRI field value in DCI format 0_1 for scheduling of a PUSCH.

If PUSCH transmission is scheduled using DCI format 0_0 and if the UE is not provided with PUCCH spatial relation information on a PUCCH resource having the lowest index to the active UL BWP b of each carrier f and the serving cell c, the UE may use the same RS resource index $q_d$ as that for PUCCH transmission in this PUCCH resource.

If PUSCH transmission is scheduled using DCI format 0_0 and if the UE is not provided with spatial setting for PUCCH transmission, if PUSCH transmission is scheduled using DCI format 0_1 not including an SRI field, or if the UE is not provided with configuration of power control over a PUSCH using an SRI, the UE may use the RS resource index $q_d$ having an ID of a zero pathloss reference RS.

If a configured grant configuration (e.g., ConfiguredGrantConfig) includes a certain parameter (for example, rrc-ConfiguredUplinkGrant) in response to PUSCH transmission configured using the configured grant configuration, the UE may be provided with the RS resource index $q_d$ from a pathloss reference index (e.g., pathlossReferenceIndex) in the certain parameter.

If the configured grant configuration does not include a certain parameter in response to PUSCH transmission configured using the configured grant configuration, the UE may determine the RS resource index $q_d$ from an ID value of a pathloss reference RS mapped on an SRI field in a DCI format for activating the PUSCH transmission. If the DCI format does not include an SRI field, the UE may determine the RS resource index $q_d$ having an ID of the zero pathloss reference RS.

Regarding $\Delta_{TF,b,f,c}(i)$, it is a transmission power adjustment component (offset, transmission format compensation) for the UL BWP b of the carrier f of the serving cell c.

Regarding $f_{b,f,c}(i,l)$, it is a PUSCH power control adjustment state with respect to the active UL BWP b of the carrier f of the serving cell c in the transmission occasion i. For example, $f_{b,f,c}(i,l)$ may be expressed by Equation (2).

[Math. 2]

$$f_{b,f,c}(i, l) = f_{b,f,c}(i - i_0, l) + \sum_{m=0}^{C(D_i)-1} \delta_{PUSCH,b,f,c}(m, l) \quad \text{Equation (2)}$$

Here, $\delta_{PUSCH,b,f,c}(i,l)$ may be a TPC command value included in DCI format 0_0 or DCI format 0_1 for scheduling of the PUSCH transmission occasion i on the active UL BWP b of the carrier f of the serving cell c, or a TPC command value coded after being coupled with a different TPC command in DCI format 2_2 having CRC scrambled using a specific RNTI (radio network temporary identifier) (e.g., TPC-PUSCH-RNTI).

Regarding $\sum_{m=0}^{C(Di)-1} \delta_{PUCCH,b,f,c}(m,l)$, it may be a total of TPC command values in a set $D_i$ of TPC command values having cardinality $C(D_i)$. Regarding $D_i$, it may be a set of TPC command values received by the UE between a moment before a PUSCH transmission occasion $i-i_0$ by a $K_{PUSCH}(i-i_0)-1$ symbol and a moment before a PUSCH transmission occasion i by a $K_{PUSCH}(i)$ symbol on the active UL BWP b of the carrier f of the serving cell c in responses to a PUSCH power control adjustment state l. Regarding $i_0$, it may be a minimum positive integer that makes the moment before the PUSCH transmission occasion $i-i_0$ by the $K_{PUSCH}(i-i_0)$ symbol come before the moment before the PUSCH transmission occasion i by the $K_{PUSCH}(i)$ symbol.

If transmission of a PUSCH is scheduled using DCI format 0_0 or DCI format 0_1, $K_{PUSCH}(i)$ may be the number of symbols in the active UL BWP b of the carrier f of the serving cell c after a final symbol of reception of a corresponding PDCCH and before a first symbol of transmission of this PUSCH. If the PUSCH transmission is configured using the configured grant configuration information (ConfiguraedGrantConfig), $K_{PUSCH}(i)$ may be the number of $K_{PUSCH,min}$ symbols equal to the product of the number of symbols $N_{symb}^{slot}$ per slot on the active UL BWP b of the carrier f of the serving cell c and a minimum of values provided from k2 in PUSCH common configuration information (PUSCH-ConfigCommon).

The power control adjustment state may be configured to have a plurality of states (two states, for example) or a single state according to a higher layer parameter. If the plurality of power control adjustment states is configured, one of the plurality of power control adjustment states may be identified using the index l (for example, l∈{0.1}).

Note that Equations (1) and (2) are not limiting expressions but are given merely as examples. The user terminal is required only to control transmission power for a PUSCH on the basis of at least one of the parameters shown as examples in Equations (1) and (2). An additional parameter may be included, or some of the parameters may be omitted. While above-described Equations (1) and (2) are to control transmission power for a PUSCH for each active UL BWP of a carrier of a certain serving cell, this is not limiting. At least some of the serving cell, the carrier, the BWP, and the power control adjustment state may be omitted.

<Transmission Power Control for PUCCH>

According to NR, transmission power for a PUCCH is controlled on the basis of a TPC command (also referred to as a value, an increase/reduction value, a correction value, an indication value, and so on) indicated by a certain field (also referred to as a TPC command field, a first field, and so on) in DCI.

For example, by using the index l to the power control adjustment state (PUCCH power control adjustment state), PUCCH transmission power ($P_{PUSCH,b,f,c}(i,q_u,q_d,l)$) in a PUCCH transmission occasion (also referred to as a transmission period, and so on) i on the active UL BWP b of the carrier f of the serving cell c may be expressed by following Equation (3). The power control adjustment state may be referred to as a value based on a TPC command of the power control adjustment state index l, a cumulative value of the TPC command, or a value determined by a closed loop. Regarding l, it may be referred to as a closed loop index.

The PUCCH transmission occasion i is a period of transmission of a PUCCH and may be configured using one or more symbols, one or more slots, and so on, for example.

[Math. 3]

$$P_{PUCCH,b,f,c}(i, q_u, q_d, l) = \min\begin{Bmatrix} P_{CMAX,f,c}(i), \\ P_{O\_PUCCH,b,f,c}(q_u) + \\ 10\log_{10}(2^\mu \cdot M_{RB,b,f,c}^{PUCCH}(i)) + PL_{b,f,c}(q_d) + \\ \Delta_{F\_PUCCH} + \Delta_{TF,b,f,c}(i) + g_{b,f,c}(i, l) \end{Bmatrix}[dBm]$$

Equation (3)

Here, $P_{CMAX,f,c}(i)$ is transmission power for the user terminal (also referred to as maximum transmission power, UE maximum output power, and the like) configured for the carrier f of the serving cell c in the transmission occasion i, for example. Regarding $P_{O\_PUCCH,b,f,c}(q_u)$, it is a parameter for target reception power configured for the active UL BWP b of the carrier f of the serving cell c in the transmission occasion i (for example, also referred to as a parameter for transmission power, transmission power offset P0, or a target reception power parameter, and so on), for example.

Regarding $M_{RB,b,f,c}^{PUCCH}(i)$, it is the number of resource blocks (bandwidths) allocated to a PUCCH for the transmission occasion i in the active UL BWP b of the carrier f of the serving cell c and the subcarrier spacing p, for example. Regarding $PL_{b,f,c}(q_d)$, it is pathloss (pathloss estimate [dB], pathloss compensation) calculated by the user terminal using the index $q_d$ to a reference signal for downlink BWP associated with the active UL BWP b of the carrier f of the serving cell c (a pathloss reference RS, an RS for pathloss reference, DL-RS for pathloss measurement, PUCCH-PathlossReferenceRS), for example.

If the UE is not given the pathloss reference RS (pathlossReferenceRSs) or in a state before the UE is given a dedicated higher layer parameter, the UE calculates pathloss $PL_{b,f,c}(q_d)$ using an RS resource obtained from an SS/PBCH block used for the UE to acquire an MIB.

If the UE is given pathloss reference RS information (pathlossReferenceRSs in PUCCH power control information (PUCCH-PowerControl)) and if the UE is not given PUCCH spatial relation information (PUCCH-SpatialRelationInfo), the UE acquire a value of a reference signal (referencesignal) in the pathloss reference RS for PUCCH from a pathloss reference RS-ID for PUCCH (PUCCH-PathlossReferenceRS-Id) having an index 0 in the pathloss reference RS information for PUCCH (PUCCH-PathlossReferenceRS). A resource for this reference signal is either on the same serving or cell on a serving cell indicated by a value of pathloss reference linking information (pathlossReferenceLinking) if such information is given. The pathloss reference linking information indicates which one of DL of a special cell (SpCell) and DL of a secondary cell (SCell) corresponding to UL of the special cell is to be employed as pathloss reference by the UE. Regarding SpCell, it may be a primary cell (PCell) in a master cell group (MCG) or may be a primary secondary cell (PSCell) in a secondary cell group (SCG). The pathloss reference RS information indicates a set of reference signals (e.g., CSI-RS configurations or SS/PBCH blocks) used for the PUCCH pathloss estimate.

Regarding $\Delta_{F\_PUCCH}(F)$, it is a higher layer parameter given to each PUCCH format. Regarding $\Delta_{TF,b,f,c}(i)$, it is a transmission power adjustment component (offset) for the UL BWP b of the carrier f of the serving cell c.

Regarding $g_{b,f,c}(i,l)$, it is a value based on a TPC command of the above-described power control adjustment state index l on the active UL BWP of the carrier f of the serving cell c and the transmission occasion i (e.g., a power control adjustment state, a cumulative value of a TPC command, a value determined by a closed loop, a PUCCH power adjustment state). For example, $g_{b,f,c}(i,l)$ may be expressed by Equation (4).

[Math. 4]

$$g_{b,f,c}(i, l) = g_{b,f,c}(i - i_0, l) + \sum_{m=0}^{C(C_i)-1} \delta_{PUCCH,b,f,c}(m, l)$$

Equation (4)

Here, $\delta_{PUCCH,b,f,c}(i, l)$ is a TPC command value and may be included in DCI format 1_0 or DCI format 1_1 detected by the UE in the PUCCH transmission occasion i of the active UL BWP b of the carrier f of the serving cell c, or may be coded after being coupled with a different TPC command in DCI format 2_2 having CRC scrambled using a specific radio network temporary identifier (RNTI) (e.g., TPC-PUSCH-RNTI).

Regarding $\sum_{m=0}^{C(Ci)-1}\delta_{PUCCH,b,f,c}(m,l)$, it may be may be a total of TPC command values in a set $C_i$ of TPC command values having cardinality $C(C_i)$. Regarding $C_i$, it may be a set of TPC command values received by the UE between a moment before a PUCCH transmission occasion $i-i_0$ by a $K_{PUCCH}(i-i_0)-1$ symbol and a moment before a PUSCH transmission occasion i by a $K_{PUCCH}(i)$ symbol on the active UL BWP b of the carrier f of the serving cell c in response to a PUCCH power control adjustment state l. Regarding $i_0$, it may be a minimum positive integer that makes the moment before the PUSCH transmission occasion $i-i_0$ by the $K_{PUCCH}(i-i_0)$ symbol come before the moment before the PUSCH transmission occasion i by the $K_{PUCCH}(i)$ symbol.

If PUCCH transmission responds to detection of DCI format 1_0 or DCI format 1_1 by the UE, $K_{PUCCH}(i)$ may be the number of symbols in the active UL BWP b of the carrier f of the serving cell c after a final symbol of reception of a corresponding PDCCH and before a first symbol of transmission of the same PUCCH. If PUCCH transmission is configured using the configured grant configuration information (ConfiguredGrantConfig), $K_{PUSCH}(i)$ may be the number of $K_{PUCCH,min}$ symbols equal to the product of the number of symbols $N_{symb}^{slot}$ per slot on the active UL BWP b of the carrier f of the serving cell c and a minimum of values provided from k2 in PUSCH common configuration information (PUSCH-ConfigCommon).

If the UE is provided with information showing use of two PUCCH power control adjustment states (twoPUCCH-PC-Adjustmentstates) and PUCCH spatial relation information (PUCCH-SpatialRelationInfo), l may be equal to {0,1}. If the UE is not provided with the information showing use of the two power control adjustment states for PUCCH or is not provided with the spatial relation information for PUCCH, l may be equal to 0.

If the UE obtains a TPC command value from DCI format 1_0 or 1_1 and if the UE is provided with the PUCCH spatial relation information, the UE may obtain mapping between a PUCCH spatial relation information ID (pucch-SpatialRelationInfoId) value and a closed loop index (closedLoopIndex, power adjustment state index l) using an index provided from P0 ID for PUCCH (p0-PUCCH-Id in p0-Set in PUCCH-PowerControl in PUCCH-Config). If the UE receives an activation command including a value of the PUCCH spatial relation information ID, the UE may determine a value of a closed loop index providing a value of l through a link to a corresponding P0 ID for PUCCH.

If the UE is provided with configuration of a $P_{O\_PUCCH,b,f,c}(q_u)$ value with respect to the corresponding PUCCH power adjustment state l in response to the active UL BWP b of the carrier f of the serving cell c, $g_{b,f,c}(i,l)=0$, k=0, 1, . . . , i. If the UE is provided with the PUCCH spatial relation information, the UE may determine a value of l from a value of $q_u$ on the basis of the PUCCH spatial relation information associated with P0 ID for PUCCH corresponding to $q_u$ and a closed loop index value corresponding to l.

Regarding $q_u$, it may be P0 ID for PUCCH (p0-PUCCH-Id) indicating P0 for PUCCH (P0-PUCCH) in a P0 set for PUCCH (P0-Set).

Note that Equations (3) and (4) are not limiting expressions but are given merely as examples. The user terminal is required only to control transmission power for a PUCCH on the basis of at least one of the parameters shown as examples in Equations (3) and (4). An additional parameter may be included, or some of the parameters may be omitted. While above-described Equations (3) and (4) are to control transmission power for a PUCCH for each active UL BWP of a carrier of a certain serving cell, this is not limiting. At least some of the serving cell, the carrier, the BWP, and the power control adjustment state may be omitted.

<Transmission Power Control for SRS>

For example, by using the index l to a power control adjustment state, transmission power for an SRS ($P_{SRS,b,f,c}(i,q_s,l)$) in an SRS transmission occasion (also referred to as a transmission period, and so on) i on the active UL BWP b of the carrier f of the serving cell c may be expressed by following Equation (5). The power control adjustment state may be referred to as a value based on a TPC command of the power control adjustment state index l, a cumulative value of the TPC command, or a value determined by a closed loop. Regarding l, it may be referred to as a closed loop index.

The SRS transmission occasion i is a period of transmission of the SRS and may be configured using one or more symbols, one or more slots, and so on, for example.

[Math. 5]

Equation (5)

$$P_{SRS,b,f,c}(i, q_s, l) = \min \left\{ \begin{array}{l} P_{CMAX,f,c}(i), \\ P_{O\_SRS,b,f,c}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [\text{dBm}]$$

Here, $P_{CMAX,f,c}(i)$ is UE maximum output power for the carrier f of the serving cell c in the SRS transmission occasion i, for example. Regarding $P_{O\_SRS,b,f,c}(q_s)$, it is a parameter for target reception power provided by p0 for the active UL BWP b of the carrier f of the serving cell c and an SRS resource set $q_s$ (provided from SRS-ResourceSet and SRS-ResourceSetId) (also referred to as a parameter about transmission power offset, transmission power offset P0, a target reception power parameter, and so on, for example).

Regarding $M_{SRS,b,f,c}(i)$, it is an SRS bandwidth expressed by the number of resource blocks with respect to the SRS transmission occasion i on the active UL BWP b of the carrier f of the serving cell c and the subcarrier spacing p.

Regarding $\alpha_{SRS,b,f,c}(q_s)$, it is provided by a (e.g., alpha) with respect to the active UL BWP b of the carrier f of the serving cell c and the subcarrier spacing p and the SRS resource set $q_s$.

Regarding $PL_{b,f,c}(q_d)$, it is a DL pathloss estimate value [dB] (pathloss estimate [dB], pathloss compensation) calculated by the UE using the RS resource index $q_d$ in response to the active DL BWP of the serving cell c and the SRS resource set $q_s$. The RS resource index $q_d$ is a pathloss reference RS (an RS for pathloss reference, a DL-RS for pathloss measurement provided by pathlossReferenceRS, for example) associated with the SRS resource set $q_s$, and is an SS/PBCH block index (e.g., ssb-Index) or a CSI-RS resource index (e.g., csi-RS-Index).

If the UE is not given the pathloss reference RS (pathlossReferenceRSs) or in a state before the UE is given a dedicated higher layer parameter, the UE calculates $PL_{b,f,c}(q_d)$ using an RS resource obtained from an SS/PBCH block used for the UE to acquire an MIB.

Regarding $h_{b,f,c}(i,l)$, it is an SRS power control adjustment state with respect to the active UL BWP of the carrier f of the serving cell c in the SRS transmission occasion i. If configuration of the SRS power control adjustment state (e.g., srs-PowerControlAdjustmentStates) exhibits a power control adjustment state same as those of SRS transmission and PUSCH transmission, a current PUSCH power control adjustment state $f_{b,f,c}(i,l)$ is applied. On the other hand, if configuration of the SRS power control adjustment state exhibits a power control adjustment state independent of those of SRS transmission and PUSCH transmission and if configuration of cumulative of TPC is not provided, the SRS power control adjustment state $h_{b,f,c}(i)$ may be expressed by Equation (6).

[Math. 6]

$$h_{b,f,c}(i) = h_{b,f,c}(i-1) + \sum_{m=0}^{C(S_i)-1} \delta_{SRS,b,f,c}(m) \quad \text{Equation (6)}$$

Here, $\delta_{SRS,b,f,c}(m)$ may be a TPC command value coded after being coupled with a different TPC command in a PDCCH having DCI (e.g., DCI format 2_3). Regarding $\Sigma_{m=0}^{C(Si)-1}\delta_{SRS,b,f,c}(m)$, it may be a total of TPC commands in a set $S_i$ of TPC command values having cardinality $C(S_i)$ received by the UE between a moment before an SRS transmission occasion $i-i_0$ by a $K_{SRS}(i-i_0)-1$ symbol and a moment before an SRS transmission occasion i by a $K_{SRS}(i)$ symbol on the active UL BWP b of the carrier f of the serving cell c and the subcarrier spacing μ. Regarding $i_0$, it may be a minimum positive integer that makes the moment before the SRS transmission occasion $i-i_0$ by the $K_{SRS}(i-i_0)-1$ symbol come before the moment before the SRS transmission occasion i by the symbol $K_{SRS}(i)$.

If transmission of an SRS is aperiodic, $K_{SRS}(i)$ may be the number of symbols in the active UL BWP b of the carrier f of the serving cell c after a final symbol of a corresponding PDCCH to trigger this SRS and before a first symbol of transmission of the same SRS. If the SRS transmission is semi-persistent or periodic, $K_{SRS}(i)$ may be the number of $K_{SRS,min}$ symbols equal to the product of the number of symbols $N_{symb}^{slot}$ per slot on the active UL BWP b of the carrier f of the serving cell c and a minimum of values provided from k2 in the PUSCH common configuration information (PUSCH-ConfigCommon).

Note that Equations (5) and (6) are not limiting expressions but are given merely as examples. The user terminal is required only to control transmission power for an SRS on the basis of at least one of the parameters shown as examples in Equations (5) and (6). An additional parameter may be included, or some of the parameters may be omitted. While above-described Equations (5) and (6) are to control transmission power for an SRS for each BWP of a carrier of a certain serving cell, this is not limiting. At least some of the cell, the carrier, the BWP, and the power control adjustment state may be omitted.

(TCI, Spatial Relation, QCL)

According to NR, control of reception processing (for example, at least one of reception, demapping, demodulation, and decoding) and transmission processing (for example, at least one of transmission, mapping, precoding, modulation, and coding) of at least one of a signal and a channel (which may be referred to as a signal/channel) has been under study on the basis of a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and Average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on a TCI state or the QCL assumption of the signal/channel.

The TCI state may be, for example, information related to QCL between a channel as a target (or a reference signal (RS) for the channel) and another signal (for example, another RS). The TCI state may be configured (indicated) by higher layer signaling or physical layer signaling, or a combination of these.

In the present disclosure, the higher layer signaling may be any one or combinations of radio Resource Control (RRC) signaling, Medium Access Control (MAC) signaling, broadcast information, and the like, for example.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which a TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), a reference signal for measurement (sounding reference signal (SRS)), and a CSI-RS for tracking (also referred to as Tracking Reference Signal (TRS)), a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The UE may receive configuration information including an information element of the TCI state (for example, PDSCH-Config, tci-StatesToAddModlist) by higher layer signaling.

An information element of the TCI state ("TCI-state IE" of RRC) configured using higher layer signaling may include a TCI state ID and one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

According to Rel. 15 NR, both an RS of the QCL type A and an RS of the QCL type D, or only the RS of the QCL type A can be configured for the UE as a TCI state of at least one of a PDCCH and a PDSCH.

If a TRS is configured as the RS of the QCL type A, the same TRS is assumed to be transmitted periodically for a long time, unlike a demodulation reference signal (DeModulation reference signal (DMRS)) for a PDCCH or a PDSCH. The UE can measure the TRS, and calculate an average delay, a delay spread, and the like.

In the UE in which the TRS as the RS of the QCL type A is configured in a TCI state of a DMRS for a PDCCH or a PDSCH, the DMRS for the PDCCH or PDSCH and a parameter for the QCL type A of the above-described TRS (average delay, average spread, or the like) can be assumed to be equal to each other. This makes it possible to obtain a parameter for the type A of the DMRS for the PDCCH or PDSCH from measurement result about this TRS. In making channel assumption of at least one of the PDCCH and PDSCH, the UE can make the channel assumption with higher accuracy using this measurement result about the TRS.

The UE configured with an RS of the QCL type D can determine a UE receive beam (a spatial domain reception filter, a UE spatial domain reception filter) using the RS of the QCL type D.

An RS of a QCL type X of the TCI state may mean an RS in the relationship of the QCL type X with a certain channel/signal (DMRS thereof), and this RS may be referred to as a QCL source of the QCL type X of this TCI state.

<TCI State for PDCCH>

Information related to the QCL between a PDCCH (or a DMRS antenna port related to the PDCCH) and a certain RS may be referred to as a TCI state for a PDCCH, and so on.

The UE may determine a TCI state for a PDCCH (CORESET) specific to the UE on the basis of higher layer signaling. For example, the UE may be configured with one or a plurality of (K) TCI states for each CORESET through RRC signaling.

One of the plurality of the TCI states configured for each CORESET in the UE through the RRC signaling may be activated using an MAC CE. This MAC CE may be referred to as a TCI state indication MAC CE for UE specific PDCCH (TCI state indication for UE-specific PDCCH MAC CE). The UE may perform monitoring of a CORESET on the basis of an active TCI state corresponding to this CORESET.

<TCI State for PDSCH>

Information related to the QCL between a PDSCH (or a DMRS antenna port related to the PDSCH) and a certain DL-RS may be referred to as a TCI state for a PDSCH, and so on.

The UE may be notified of (configured with) M (M 1) TCI states for PDSCH (M pieces of QCL information for PDSCH) by higher layer signaling. Note that the number M of TCI states configured in the UE may be limited by at least one of UE capability and a QCL type.

Regarding DCI used for scheduling of a PDSCH, it may include a certain field indicating a TCI state of this PDSCH (this field may be referred to as a TCI field or a TCI state field, for example). This DCI may be used for scheduling of a PDSCH in one cell and may be referred to as DL DCI, DL assignment, DCI format 1_0, or DCI format 1_1, for example.

Whether the TCI field is included in the DCI may be controlled by information notified to the UE from a base station. This information may be information indicating the presence or absence of a TCI field in DCI (present or absent) (for example, TCI presence information, TCI presence information in DCI, a higher layer parameter TCI-PresentInDCI). For example, this information may be configured in the UE by higher layer signaling.

If TCI states of more than eight types are configured in the UE, eight types of TCI states or less TCI states may be activated (or indicated) using an MAC CE. This MAC CE may be referred to as a TCI state activation/deactivation MAC CE for UE specific PDSCH (TCI States Activation/Deactivation for UE-specific PDSCH MAC CE). A value of a TCI field in DCI may indicate one of the TCI states activated by the MAC CE.

If the UE is configured with the TCI presence information set to be "enabled" in response to a CORESET for scheduling of a PDSCH (CORESET used for transmission of a PDCCH for scheduling of the PDSCH), the UE may assume that the TCI field is in DCI format 1_1 of the PDCCH to be transmitted on this CORESET.

In a case where the TCI presence information is not configured for the CORESET for scheduling of the PDSCH or this PDSCH is scheduled using DCI format 1_0, if time offset between reception of DL DCI (DCI for scheduling of this PDSCH) and reception of the PDSCH corresponding to this DCI is equal to or greater than a threshold, the UE may assume that a TCI state or QCL assumption with respect to this PDSCH is the same as a TCI state or QCL assumption to be applied to a CORESET used for transmission of the PDCCH for scheduling of the same PDSCH for determining the QCL of a PDSCH antenna port.

With the TCI presence information set to be "enabled," if a TCI field in DCI in a component carrier (CC) for scheduling (of the PDSCH) indicates an activated TCI state in the CC or DL BWP to be scheduled and if this PDSCH is scheduled using DCI format 1_1, the UE may use TCI complying with a value of a TCI field in the detected PDCCH having the DCI for determining the QCL of the antenna port of this PDSCH. If the time offset between reception of the DL DCI (for scheduling of this PDSCH) and reception of the PDSCH corresponding to this DCI (PDSCH scheduled using this DCI) is equal to or greater than the threshold, the UE may assume that a DM-RS port of the PDSCH in a serving cell satisfies the relationship of QCL with an RS in the TCI state related to a QCL type parameter given by the indicated TCI state.

If the UE is configured with a single slot PDSCH, the indicated TCI state may be based on the activated TCI state in a slot having the scheduled PDSCH. If the UE is configured with a PDSCH with a plurality of slots, the indicated TCI state may be based on the activated TCI state in a first slot having a scheduled PDSCH, or the UE may expect that the indicated TCI state is common between slots having the scheduled PDSCH. If the UE is configured with a CORESET associated with a search space set for cross-carrier scheduling, if the TCI presence information in the UE is set to be "enabled" in response to this CORESET, and at least one of TCI states configured in response to a serving cell scheduled by a search space set includes the QCL type D, the UE may assume that time offset between a detected PDCCH and a PDSCH corresponding to this PDCCH is equal to or greater than the threshold.

In an RRC connected mode, both in a case where TCI information in DCI (higher layer parameter TCI-PresentInDCI) is set to be "enabled" and in a case where TCI information in DCI is not configured, if time offset between reception of DL DCI (DCI for scheduling of a PDSCH) and the corresponding PDSCH (PDSCH scheduled using this DCI) is less than the threshold, the UE may assume that a DM-RS port for the PDSCH in a serving cell has the minimum (lowest) CORESET-ID in the most recent (latest) slot in which the UE monitors one or more CORESETs in an active BWP in the serving cell, and that the DM-RS port is QCL with an RS related to a QCL parameter used for QCL indication of a PDCCH in a CORESET associated with a monitored search space (FIG. 1). This RS may be referred to as a default TCI state of the PDSCH or default QCL assumption of the PDSCH.

The time offset between reception of the DL DCI and reception of the PDSCH corresponding to this DCI may be referred to as scheduling offset.

The above-described threshold may be referred to as a time duration for QCL, "timeDurationForQCL," "Threshold," "Threshold for offset between a DCI indicating a TCI state and a PDSCH scheduled by the DCI," "ThresholdSched-Offset," a schedule offset threshold, a scheduling offset threshold, and so on.

The time duration for QCL may be based on UE capability or may be based on delay in demodulation of a PDCCH and delay in beam switching, for example. The time duration for QCL may be minimum time required for the UE to receive a PDCCH and to apply spatial QCL information received in DCI for PDSCH processing. The time duration for QCL may be expressed by the number of symbols for each subcarrier spacing or may be expressed by time (e.g., μs). Information on this time duration for QCL may be reported to the base station as UE capability information from the UE or may be configured in the UE from the base station using higher layer signaling.

For example, the UE may assume that a DMRS port for the above-described PDSCH satisfies the relationship of QCL with a DL-RS based on the activated TCI state about a CORESET corresponding to the above-described minimum CORESET-ID. The latest slot may be a slot for receiving DCI for scheduling of the above-described PDSCH, for example.

Note that the CORESET-ID may be an ID configured using an RRC information element "ControlResourceSet" (an ID for CORESET identification, controlResourceSetId).

If no CORESET is configured in response to a CC, the default TCI state may be an activated TCI state applicable to a PDSCH in an active DL BWP of the CC and having the lowest ID.

According to Rel. 16 (or later versions), in a case where a PDSCH and a PDCCH for scheduling of this PDSCH are in different component carriers (CCs) (cross-carrier scheduling), if delay from the PDCCH to the PDSCH (PDCCH-to-PDSCH delay) is shorter than the time duration for QCL or if the TCI state is absent in DCI for this scheduling, the UE may acquire QCL assumption for PDSCH scheduled from an active TCI state applicable to the scheduled PDSCH in the active BWP in a cell and having the lowest ID.

<Spatial Relation for PUCCH>

The UE may be configured with a parameter used for PUCCH transmission (PUCCH configuration information, PUCCH-Config) by higher layer signaling (e.g., radio resource control (RRC) signaling). The PUCCH configuration information may be configured for each partial bandwidth (e.g., uplink bandwidth part (BWP)) in a carrier (also referred to as a cell, a component carrier (CC)).

The PUCCH configuration information may include a list of PUCCH resource set information (e.g., PUCCH-ResourceSet) and a list of PUCCH spatial relation information (e.g., PUCCH-SpatialRelationInfo).

The PUCCH resource set information may include a list (e.g., resourceList) of PUCCH resource indexes (IDs such as PUCCH-ResourceId, for example).

If the UE does not have dedicated PUCCH resource configuration information (e.g., a dedicated PUCCH resource configuration) provided from the PUCCH resource set information in the PUCCH configuration information (before RRC setup), the UE may determine a PUCCH resource set on the basis of a parameter (e.g., pucch-ResourceCommon) in system information (e.g., System Information Block Type 1 (SIB1) or Remaining Minimum System Information (RMSI)). This PUCCH resource set may include 16 PUCCH resources.

On the other hand, if the UE has the above-described dedicated PUCCH resource configuration information (a UE-dedicated uplink control channel configuration, a dedicated PUCCH resource configuration) (after the RRC setup), the UE may determine a PUCCH resource set according to the number of UCI information bits.

The UE may determine one PUCCH resource (index) in the above-described PUCCH resource set (e.g., a determined PUCCH resource set dedicated to a cell or dedicated to the UE) on the basis of at least one of a value of a certain field (e.g., a PUCCH resource indicator field) in downlink control information (DCI) (e.g., DCI format 1_0 or 1_1 used for scheduling of a PDSCH), the number of CCEs ($N_{CCE}$) in a control resource set (COntrol REsource SET (CORESET)) for reception of a PDCCH for carrying the DCI, and an index ($n_{CCE,0}$) to a beginning (initial) CCE of the PDCCH reception.

The PUCCH spatial relation information (e.g., "PUCCH-spatialRelationInfo" in the RRC information element) may indicate a plurality of candidate beams (spatial domain filters) for PUCCH transmission. The PUCCH spatial relation information may indicate spatial relation between an RS (reference signal) and a PUCCH.

A list of the PUCCH spatial relation information may include some elements (PUCCH spatial relation information IE (information element)). Each PUCCH spatial relation information may include information related to at least one of an index to the PUCCH spatial relation information (ID that is pucch-SpatialRElationInfoId, for example), an index to a serving cell (ID that is servingCellId, for example), and an RS (reference RS) to be spatially related to a PUCCH, for example.

For example, this information related to the RS may be an SSB index, a CSI-RS index (e.g., an NZP-CSI-RS resource configuration ID), or an SRS resource ID and a BWP ID. The SSB index, the CSI-RS index, and the SRS resource ID may be associated with at least one of a beam, a resource, and a port selected through measurement of a corresponding RS.

If more than one piece of spatial relation information relating to a PUCCH is configured, the UE may exert control on the basis of a PUCCH spatial relation Activation/Deactivation MAC CE in such a manner that one PUCCH spatial relation information is made active in response to one PUCCH resource at certain time.

According to Rel. 15 NR, a PUCCH spatial relation activation/deactivation MAC CE is expressed by a total of three octets (8 bits multiplied by 3=24 bits) including octets (Oct) 1 to 3.

This MAC CE may include information such as a serving cell ID ("Serving Cell ID" field) to be applied, a BWP ID ("BWP ID" field), a PUCCH resource ID ("PUCCH Resource ID" field), and so on.

This MAC CE includes a field of "$S_i$"(i=0 to 7). If a field of certain $S_i$ shows 1, the UE activates spatial relation information of spatial relation information ID #i. If a field of certain $S_i$ shows 0, the UE deactivates spatial relation information of the spatial relation information ID #i.

The UE may activate PUCCH spatial information indicated by a MAC CE after 3 ms from transmission of acknowledgment response (ACK) to this MAC CE for activating certain PUCCH spatial relation information.

<Spatial Relation for SRS, PUSCH>

The UE may receive information (SRS configuration information that is a parameter in "SRS-Config" of an RRC control element, for example) used for transmission of a reference signal for measurement (e.g., a sounding reference signal (SRS)).

More specifically, the UE may receive at least one of information related to one or a plurality of SRS resource sets (SRS resource set information such as "SRS-ResourceSet" of an RRC control element, for example) and information related to one or a plurality of SRS resources (SRS resource information such as "SRS-Resource" of an RRC control element, for example).

One SRS resource set may be related to a certain number of SRS resources (prepared by forming a group of the certain number of SRS resources). Each SRS resource may be identified using an SRS resource identifier (SRS Resource Indicator (SRI)) or an SRS resource ID (identifier).

The SRS resource set information may include an SRS resource set ID (SRS-ResourceSetId), a list of SRS resource IDs (SRS-ResourceId) used in this resource set, an SRS resource type, and usage of an SRS.

Here, the SRS resource type may indicate any of a periodic SRS (P-SRS), a semi-persistent SRS (SP-SRS), and an aperiodic SRS (A-SRS, AP-SRS). Note that the UE may transmit the P-SRS and the SP-SRS periodically (or periodically after activation), and may transmit the A-SRS on the basis of an SRS request from DCI.

The usage ("usage" in an RRC parameter, "SRS-SetUse" in an L1 (layer-1) parameter) may be beam management (beamManagement), codebook base transmission (codebook: CB), a non-codebook base transmission (nonCodebook: NCB), antenna switching (antennaSwitching), or the like, for example. An SRS for the usage of the codebook base transmission or the non-codebook base transmission may be used in determining a precoder of a PUSCH transmission of a codebook base or a non-codebook base based on an SRI.

In the case of codebook base transmission, the UE may determine a precoder for PUSCH transmission on the basis of an SRI, a transmitted rank indicator (TRI), and a transmitted precoding matrix indicator (TPMI), for example. In the case of non-codebook base transmission, the UE may determine a precoder for PUSCH transmission on the basis of an SRI.

The SRS resource information may include an SRS resource ID (SRS-ResourceId), the number of SRS ports, an SRS port number, transmission Comb, SRS resource mapping (e.g., a time and/or frequency resource position, resource offset, a resource cycle, repetition, the number of SRS symbols, an SRS bandwidth, and so on), hopping related information, an SRS resource type, a sequence ID, SRS spatial relation information, and the like.

The SRS spatial relation information (e.g., "spatialRelationInfo" in the RRC information element) may indicate spatial relation information between a certain reference signal and an SRS. This certain reference signal may be, for example, at least one of a synchronization signal/broadcast channel (a synchronization signal/physical broadcast channel: SS/PBCH) block, a channel state information reference signal (CSI-RS), and an SRS (e.g., a different SRS, for example). The SS/PBCH block may be referred to as a synchronization signal block (SSB).

The SRS spatial relation information may include at least one of an SSB index, a CSI-RS resource ID, and an SRS resource ID as an index to the above-described certain reference signal.

Note that, in the present disclosure, an SSB index, an SSB resource ID, and an SSBRI (SSB Resource Indicator) may be interchangeably interpreted. A CSI-RS index, a CSI-RS resource ID, and a CRI (CSI-RS resource indicator) may be interchangeably interpreted. An SRS index, an SRS resource ID, and an SRI may be interchangeably interpreted.

The SRS spatial relation information may include a serving cell index corresponding to the above-described certain reference signal, a BWP index (BWP ID), and so on.

According to NR, transmission of an uplink signal may be controlled on the basis of the presence or absence of beam correspondence (BC). For example, the BC may be the capability to determine a beam (transmit beam, Tx beam) used for signal transmission on the basis of a beam (receive beam, Rx beam) used for signal reception by a certain node (e.g., base station or UE).

Note that the BC may be referred to as transmit/receive beam correspondence (Tx/Rx beam correspondence), beam reciprocity, beam calibration, calibrated/non-calibrated, reciprocity calibrated/non-calibrated, a degree of correspondence, a degree of coincidence, and so on.

In the absence of the BC, for example, the UE may transmit an uplink signal (e.g., PUSCH, PUCCH, SRS, or the like) using the same beam (spatial domain transmission filter) as an SRS (or SRS resource) indicated from the base station on the basis of measurement result about one or more SRSs (or SRS resources).

On the other hand, in the presence of the BC, the UE may transmit an uplink signal (e.g., PUSCH, PUCCH, SRS, or the like) using a beam (spatial domain transmission filter) same as or corresponding to a beam (spatial domain reception filter) used for reception of a certain SSB or CSI-RS (or CSI-RS resource).

If a certain SRS resource is configured with an SSB or an CSI-RS, and spatial relation information related to an SRS (in the presence of the BC, for example), the UE may transmit this SRS resource using the same spatial domain filter (spatial domain transmission filter) as a spatial domain filter (spatial domain reception filter) for reception of this SSB or CSI-RS. In this case, the UE may assume that a UE receive beam of the SSB or CSI-RS is the same as a UE transmit beam of the SRS.

If a certain SRS (target SRS) resource is configured with spatial relation information related to a different SRS (reference SRS) and the certain SRS (target SRS) (in the absence of the BC, for example), the UE may transmit the target SRS resource using the same spatial domain filter (spatial domain transmission filter) as a spatial domain filter (spatial domain transmission filter) for transmission of this reference SRS. Namely, in this case, the UE may assume that a UE transmit beam of the reference SRS is the same as a UE transmit beam of the target SRS.

On the basis of a value of a certain field (e.g., an SRS resource identifier (SRI) field) in DCI (e.g., DCI format 0_1), the UE may determine spatial relation of a PUSCH scheduled using this DCI. More specifically, the UE may use spatial relation information (e.g., "spatialRelationInfo" of an RRC information element) about an SRS resource determined on the basis of a value of the certain field (e.g., SRI) for transmission of a PUSCH.

If codebook base transmission is used for the PUSCH, the UE may be configured with two SRS resources by an RRC and may be given one of the two SRS resources from DCI (certain one-bit field). If non-codebook base transmission is used for the PUSCH, the UE may be configured with four SRS resources by the RRC and may be given one of the four SRS resources from DCI (certain two-bit field). RRC reconfiguration is required for using spatial relation other than the two or four pieces of spatial relations configured by the RRC.

Note that a DL-RS is configurable for spatial relation of an SRS resource used for the PUSCH. For example, in response to an SP-SRS, the UE can be configured with spatial relation of a plurality of SRS resources (e.g., up to 16 resources) using RRC, and can be given one of the plurality of SRS resources from a MAC CE.

(Default Spatial Relation)

Default spatial relation is under study. If spatial relation information is not configured for a dedicated PUCCH (a PUCCH based on individual PUCCH configuration (PUCCH-Config)) or a dedicated SRS (an SRS based on individual SRS configuration (SRS-Config)) except an SRS having beam management usage (usage='beamManagement') in a certain frequency range (e.g., frequency range (FR)2), default spatial relation may be applied to the dedicated PUCCH configuration or the dedicated SRS configuration, at least in a particular case. The particular case may be a case where a pathloss reference RS is not configured by RRC signaling.

In a case where a CORESET is configured on a CC, for example, the default spatial relation may be a TCI state or QCL assumption of a CORESET having the lowest ID. An RS used for pathloss calculation may be an RS of the same QCL type D as a TCI state or QCL assumption of the CORESET having the lowest ID. The RS used for the pathloss calculation may be a periodic RS.

In a case where no CORESET is configured on a CC, for example, the default spatial relation may be an activated TCI state having the lowest ID applicable to a PDSCH in an active DL-BWP of this CC.

The default spatial relation may be applied to the UE to support beam correspondence. The default spatial relation may be applied to a single TRP case.

If a pathloss reference RS is not configured, the RS used for the pathloss calculation may be referred to as a default pathloss reference RS.

(Spatial Relation of PUSCH Scheduled Using DCI Format 0_0)

According to Rel. 15 NR, in response to a PUSCH on a cell scheduled using DCI format 0_0, the UE transmits this PUSCH by complying with spatial relation corresponding to a dedicated PUCCH resource having the lowest ID within the active UL BWP of this cell, if such a cell is available. The dedicated PUCCH resource may be a PUCCH resource configured in a dedicated manner to the UE (configured by a higher layer parameter PUCCH-Config).

While DCI format 0_1 includes an SRI, DCI format 0_0 does not include an SRI.

This prohibits scheduling of a PUSCH using DCI format 0_0 for a cell not configured with a PUCCH resource (e.g., a secondary cell (SCell)).

If PUCCH on SCell (a PUCCH transmitted on SCell) is not configured, UCI is transmitted on PCell. If PUCCH on SCell is configured, UCI is transmitted on PUCCH-SCell. Thus, a PUCCH resource and spatial relation information are not required to be configured for every SCell but there can be a cell not configured with a PUCCH resource.

While DCI format 0_1 includes a carrier indicator field (CIF), DCI format 0_0 does not include a CIF. This prohibits cross-carrier scheduling of a PUSCH on SCell using DCI format 0_0 on PCell, even if a PUCCH resource is configured in PCell.

According to Rel. 15 NR, in an RRC connected mode, and in the frequency range (FR)2, the UE is not configured with a PUCCH resource having PUCCH spatial relation information and does not expect a PUSCH to be scheduled using DCI format 0_0 in the BWP.

The following functions 1 and 2 are under study in response to a PUSCH scheduled using DCI format 0_0.

[Function 1]

In the absence of a PUCCH resource configured on a CC in FR2 and in the RRC connected mode, default spatial relation of a PUSCH scheduled using DCI format 0_0 and a default pathloss reference RS are supported. The function 1 may be applied to the UE to support the function of default spatial relation of a dedicated PUCCH or a dedicated SRS according to Rel. 16, or may be applied to a case where the UE to support the function of default spatial relation for a dedicated PUCCH or a dedicated SRS according to Rel. 16 is configured by a base station.

An RRC parameter for enabling the function of default spatial relation for a dedicated PUCCH or a dedicated SRS may be introduced. The default spatial relation may be a TCI state or QCL assumption of a CORESET having the lowest ID. A default pathloss reference RS may be an RS of the same QCL type D as a TCI state or QCL assumption of the CORESET having the lowest ID. The default pathloss reference RS may be a periodic RS.

[Function 2]

In FR2 and in the RRC connected mode, scheduling of a PUSCH using DCI format 0_0 on a CC having configured PUCCH resources is supported. Here, regarding all the configured PUCCH resources, none of these configurations is accompanied by spatial relation.

In response to a PUSCH scheduled using DCI format 0_0, spatial relation and a pathloss reference RS may comply with spatial relation and a pathloss reference RS respectively with respect to the PUCCH resources. In response to the PUSCH scheduled using DCI format 0_0, spatial relation and a pathloss reference RS with respect to a PUCCH resource may be default spatial relation and a default pathloss reference RS respectively with respect to the PUCCH resources.

The function 1 handles a case where a PUCCH resource is not configured, and the function 2 handles a case where a PUCCH resource is configured and spatial relation is not configured. A cell (CC) as a target of the function 2 is PCell or PUCCH-SCell, and is assumed to be configured with a PUCCH resource. If a network uses the function of default spatial relation, the absence of configuration of spatial relation in a PUCCH resource is assumable. A cell as a target of the function 1 is a cell other than PCell and PUCCH-SCell, and is not configured with a PUCCH resource.

(Problem)

It is assumed that spatial relation is not configured in some of a plurality of configured PUCCH resources. As described above, as spatial relation with the lowest PUCCH resource ID is used according to Rel. 15 NR, the spatial relation in this case is unclear. A PUCCH resource to be used in a cell is also unclear. Unless spatial relation is clearly shown, reduction in system performance such as throughput reduction may be caused.

If a pathloss reference RS is not configured and if no CORESET is configured on a CC, an RS used for pathloss calculation is unclear. Unless an RS used for pathloss calculation is clearly shown, reduction in system performance such as throughput reduction may be caused.

Then, the inventors of the present invention came up with the idea of a method of determining a reference signal appropriately to be used for at least one of QCL and pathloss calculation for uplink transmission.

Embodiments according to the present disclosure will be described in detail with reference to the drawings as follows. The radio communication method according to each embodiment may be employed independently or may be employed in combination.

In the present disclosure, a cell, a CC, a carrier, a BWP, and a band may be interchangeably interpreted.

In the present disclosure, an index, an ID, an indicator, and a resource ID may be interchangeably interpreted.

In the present disclosure, specific UL transmission, a specific UL signal, UL transmission of a specific type, a specific UL channel, a PUSCH, a PUCCH, an SRS, a P-SRS, an SP-SRS, and an A-SRS may be interchangeably interpreted. In the present disclosure, a specific DL signal, a specific DL resource, DL transmission of a specific type, specific DL transmission, specific DL reception, a specific DL channel, a PDSCH, a PDCCH, a CORESET, a DL-RS, an SSB, and a CSI-RS may be interchangeably interpreted.

A TCI state, a TCI state or QCL assumption, QCL assumption, a QCL parameter, a spatial domain reception filter, a UE spatial domain reception filter, a spatial domain filter, a UE receive beam, a DL receive beam, DL precoding, a DL precoder, a DL-RS, an RS of the QCL type D of a TCI state or QCL assumption, and an RS of the QCL type A of a TCI state or QCL assumption may be interchangeably interpreted. An RS of the QCL type D, a DL-RS associated with the QCL type D, a DL-RS having the QCL type D, a source for a DL-RS, an SSB, and a CSI-RS may be interchangeably interpreted.

In the present disclosure, a TCI state may be information (e.g., a DL-RS, a QCL type, a cell for transmission of a DL-RS, and the like) about a receive beam (spatial domain reception filter) indicated (configured) in the UE. Regarding QCL assumption, it may be information (e.g., a DL-RS, a QCL type, a cell for transmission of a DL-RS, and the like) about a receive beam (spatial domain reception filter) assumed by the UE on the basis of transmission or reception of an associated signal (e.g., a PRACH).

In the present disclosure, the latest slot, the most recent slot, the latest search space, and the most recent search space may be interchangeably interpreted. In the present disclosure, the lowest ID, the highest ID, and a certain (specific) ID may be interchangeably interpreted. For example, a CORESET having the lowest ID, a CORESET having the highest ID, and a CORESET having a certain ID may be interchangeably interpreted. For example, an active TCI state having the lowest ID, an active TCI state having the highest ID, and an active TCI state having a certain ID may be interchangeably interpreted.

In the present disclosure, spatial relation, spatial relation information, spatial relation assumption, a QCL parameter, a spatial domain transmission filter, a UE spatial domain transmission filter, a spatial domain filter, a UE transmit beam, a UL transmit beam, UL precoding, a UL precoder, an RS of spatial relation, a DL-RS, QCL assumption, an SRI, spatial relation based on an SRI, and a UL TCI may be interchangeably interpreted.

In the present disclosure, a default TCI state, default QCL, and default QCL assumption may be interchangeably interpreted. While this default TCI state or QCL (QCL assumption) is mainly expressed as a default TCI state in the following, the designation thereof is not limited to this. Note that the definition of the default TCI state is not limited to this. The default TCI state may be a TCI state assumed if a TCI state/QCL indicated using DCI is unavailable for a certain channel/signal (e.g., a PDSCH), or may be a TCI state assumed if a TCI state/QCL is not indicated (or configured), for example.

In the present disclosure, default spatial relation, default spatial relation assumption, an RS of the QCL of a specific DL resource, a TCI state or QCL assumption of a specific DL resource, a TCI state or QCL assumption of a specific DL signal, an RS related to a QCL parameter given by a TCI state or QCL assumption of a specific DL signal, an RS of the QCL type D in a TCI state or QCL assumption of a specific DL signal, and spatial relation of reference UL transmission may be interchangeably interpreted.

In the present disclosure, a TRS, a tracking CSI-RS, a CSI-RS having TRS information (higher layer parameter trs-Info), and an NZP-CSI-RS resource in an NZP-CSI-RS resource set having TRS information may be interchangeably interpreted.

In the present disclosure, DCI format 0_0, DCI not including an SRI, DCI not including indication on spatial relation, and DCI not including a CIF may be interchangeably interpreted. In the present disclosure, DCI format 0_1, DCI including an SRI, DCI including indication on spatial relation, and DCI including a CIF may be interchangeably interpreted.

In the present disclosure, a pathloss reference RS, an RS for pathloss reference, an RS for pathloss estimate, an RS for pathloss calculation, pathloss (PL)-RS, an index $q_d$, an RS used for pathloss calculation, an RS resource used for pathloss calculation, and a calculation RS may be interchangeably interpreted. Calculation, assumption, and measurement may be interchangeably interpreted.

In the present disclosure, "The UE transmits specific UL transmission by complying with default spatial relation," "The UE uses default spatial relation as spatial relation of specific UL transmission," "The UE assumes (considers)

that spatial relation of specific UL transmission is the same as an RS of default spatial relation," and "The UE assumes (considers) that spatial relation of specific UL transmission is the same as an RS of the QCL type D of default spatial relation" may be interchangeably interpreted.

(Radio Communication Method)

<<Default Spatial Relation Application Condition>>

If a default spatial relation application condition is satisfied, the UE may apply default spatial relation to spatial relation of specific UL transmission. The specific UL transmission may be at least one f a PUSCH, a PUCCH, an SRS, a P-SRS, an SP-SRS, and an A-SRS.

The default spatial relation application condition may be obtained from a logical sum of a plurality of default spatial relation application conditions, from a logical product of a plurality of default spatial relation application conditions, or from a combination of a logical sum and a logical product of a plurality of default spatial relation application conditions.

The specific UL transmission may be in a specific frequency range (e.g., frequency range (FR)2), or may be UL transmission based on dedicated PUCCH configuration or dedicated SRS configuration except an SRS having beam management usage (usage='beamManagement') and an SRS having non-codebook base transmission usage (usage='nonCodebook') having configuration of an associated CSI-RS (associatedCSI-RS). The specific UL transmission may be a PUSCH scheduled using DCI format 0_0. For example, the specific UL transmission may be a PUSCH on a cell scheduled using DCI format 0_0 if a PUCCH resource (e.g., a dedicated PUCCH resource) having spatial relation (e.g., active spatial relation) is not configured in the active UL BWP of this cell. The specific UL transmission may be an SRS based on an SRS resource extending over a plurality of slots in an SRS resource set for antenna switching usage (usage='antennaSwitching').

The default spatial relation application condition may include at least one of conditions satisfied if spatial relation information on the specific UL transmission is not configured, if the specific UL transmission is within a frequency range (e.g., frequency range (FR)2), if the specific UL transmission is based on dedicated PUCCH configuration or dedicated SRS configuration except an SRS having beam management usage (usage='beamManagement') and an SRS having non-codebook base transmission usage (usage='nonCodebook') having configuration of an associated CSI-RS (associatedCSI-RS), and if the UE supports beam correspondence. The spatial relation information on the specific UL transmission may be spatial relation information in dedicated PUCCH configuration or dedicated SRS configuration. The associated CSI-RS may be an ID (index) of a CSI-RS resource associated with an SRS resource set in the non-codebook base transmission.

The default spatial relation application condition may include a condition satisfied if a pathloss reference RS is not configured in response to the specific UL transmission. The default spatial relation application condition may include a condition satisfied if a pathloss reference RS is not configured by higher layer signaling in response to the specific UL transmission.

The default spatial relation application condition may include a condition satisfied if only one TCI state is active in response to a PDCCH (the number of active TCI states with respect to a PDCCH is one). This default spatial relation application condition simplifies UE operation.

The default spatial relation application condition may include a condition satisfied if only one TCI state is active in response to a PDCCH and a PDSCH (the number of active TCI states with respect to a PDCCH and a PDSCH is one). Using a single active beam in response to UL and DL simplifies UE operation.

The default spatial relation application condition may include a condition satisfied if a PDCCH and a PUCCH scheduled using this PDCCH are in the same BWP or on the same CC (cross-carrier scheduling is not used). The UE cannot always apply the same beam to a PDCCH and a PUCCH in the case of cross-carrier scheduling. For this reason, excluding cross-carrier scheduling simplifies UE operation. In the case of inter-band carrier aggregation (CA), for example, different beams may be applied to a PDCCH and a PUCCH. As another example, in the case of FR1-FR2 CA, if DCI in FR1 and a PUCCH, an SRS, or a PUSCH is in FR2, it is probable that the UE cannot determine a beam.

The default spatial relation application condition may include a condition satisfied if the inter-band CA is not used.

The default spatial relation application condition may include a condition satisfied if an SRI for specific UL transmission PUSCH is absent. The default spatial relation application condition may include a condition satisfied if an SRS resource corresponding to an SRI for PUSCH is absent.

The default spatial relation application condition may include a condition satisfied if spatial relation information is not configured in response to at least one SRS resource in an SRS resource set.

The default spatial relation may be an RS of QCL of a specific DL resource. An RS of QCL of a specific DL resource, an RS related to a QCL parameter of a specific DL resource, an RS of QCL with respect to a specific DL resource, and an RS of the QCL type D with respect to a specific DL resource may be interchangeably interpreted.

An RS of default spatial relation may be an RS of the QCL type D or an RS of the QCL type A, or may be an RS of the QCL type D or an RS of the QCL type A, if applicable.

The specific DL resource may be the latest slot with respect to the specific UL transmission. The latest slot may be the latest slot with respect to a start symbol (or before the start symbol) of the specific UL transmission. The latest slot may be the latest slot with respect to a start symbol or a final symbol (or before either symbol) of a DL signal corresponding to the specific UL transmission. If the specific UL transmission is a PUCCH, for example, a DL signal corresponding to the specific UL transmission may be a PDSCH corresponding to the PUCCH (a PDSCH corresponding to HARQ-ACK carried on the PUCCH).

If a pathloss reference signal (a pathloss reference RS) is not configured in response to specific uplink transmission (if a default pathloss reference RS application condition is satisfied in response to the specific uplink transmission), the UE may determine a reference signal (e.g., a default pathloss reference RS, a calculation RS) used for pathloss calculation and calculate pathloss on the basis of at least one quasi-co-location (QCL) parameter corresponding to at least one specific DL resource (e.g., a specific CORESET, a specific PDCCH, a specific SSB).

<<Default Spatial Relation>>

The default spatial relation may be an RS of QCL of a specific DL resource.

An RS of QCL of a specific DL resource, a default TCI state or default QCL assumption of a specific DL resource, a TCI state of a CORESET having the lowest CORESET ID in the most recent slot, an RS related to a QCL parameter used for QCL indication of a PDCCH for a CORESET having the lowest CORESET-ID in the latest slot in which the UE monitors one or more CORESETs in an active BWP in a serving cell and associated with monitored search space, a TCI state or QCL assumption of a CORESET having the lowest CORESET-ID in the latest slot and associated with monitored search space, a TCI state or QCL assumption of a CORESET having the lowest CORESET-ID in a specific slot and associated with monitored search space, a TCI state or QCL assumption of a specific CORESET, a TCI state or QCL assumption of a DL signal corresponding to specific UL transmission (e.g., a DL channel for triggering specific UL transmission, a DL channel for scheduling specific UL transmission, a DL channel for scheduling of a DL channel corresponding to specific UL transmission), an RS related to a QCL parameter of a specific DL resource, and an RS of QCL with respect to a specific DL resource may be interchangeably interpreted.

An RS of default spatial relation, of a default TCI state, or of default QCL assumption may be an RS of the QCL type D or an RS of the QCL type A, or may be an RS of the QCL type D or an RS of the QCL type A, if applicable.

The latest slot may be the latest slot with respect to a specific DL resource. The latest slot may be the latest slot with respect to a start symbol (or before the start symbol) of specific UL transmission. The latest slot may be the latest slot with respect to a start symbol or a final symbol (or before either symbol) of a DL signal corresponding to the specific UL transmission. If the specific UL transmission is a PUCCH, for example, a DL signal corresponding to the specific UL transmission may be a PDSCH corresponding to the PUCCH (a PDSCH corresponding to HARQ-ACK carried on the PUCCH).

Spatial relation of specific UL transmission may be default QCL of a PDSCH.

If a CORESET is configured on a CC to which default spatial relation is applied, default QCL of a PDSCH may be a TCI state corresponding to the lowest CORESET ID of the most recent (latest) slot or the most recent search space. If no CORESET is configured on a CC to which default spatial relation is applied, default QCL of a PDSCH is applicable to a PDSCH in an active DL BWP of this CC and may be an activated TCI state having the lowest ID.

The specific DL resource may be a PDSCH.

Default spatial relation may be one of active TCI states (activated TCI states) of a CORESET.

A plurality of TCI states may be active in response to a CORESET. In this case, an active TCI state to be selected as default spatial relation may be a default RS, a default TCI state, or default QCL assumption.

The specific DL resource may be a PDCCH.

If specific UL transmission corresponds to a PDCCH (an aperiodic PDCCH or an aperiodic SRS) (if the specific UL transmission is scheduled or triggered by a PDCCH (DL DCI) for PDSCH scheduling), spatial relation of the specific UL transmission may be a TCI state of this PDCCH. The specific UL transmission may be an A-SRS triggered by this PDCCH, or may be a PUCCH for carrying HARQ-ACK with respect to a PDSCH scheduled using this PDCCH. If the specific UL transmission is an A-SRS, for example, a PDCCH corresponding to the specific UL transmission may be a PDCCH for triggering the A-SRS. As another example, if the specific UL transmission is a PUCCH for carrying HARQ-ACK, a PDCCH corresponding to the specific UL transmission may be a PDCCH for scheduling of a PDSCH and indicating timing of HARQ-ACK of the scheduled PDSCH. If the specific UL transmission does not correspond to a PDCCH, spatial relation of the specific UL transmission may be similar to the above-described A-1.

The specific DL resource may be a PDCCH or a PDSCH.

The default spatial relation may be QCL assumption of CORESET #0 (a CORESET having an ID 0).

The specific DL resource may be CORESET #0.

Spatial relation of the specific UL transmission may be an RS used for pathloss calculation according to Rel. 15 (a calculation RS according to Rel. 15, a TCI state of an RS used for pathloss calculation). An RS used for pathloss calculation, an RS resource used for pathloss calculation, a calculation RS, and a default pathloss reference RS may be interchangeably interpreted.

The calculation RS may be an RS resource obtained from an SS/PBCH block used by the UE for acquiring an MIB.

The calculation RS may be a pathloss reference RS having an index 0 in pathloss reference RS information (a list of pathloss reference RSs). If the UE is given pathloss reference RS information (pathlossReferenceRSs in PUCCH power control information (PUCCH-PowerControl)) and if the UE is not given PUCCH spatial relation information (PUCCH-SpatialRelationInfo), for example, the calculation RS may be a reference signal (referencesignal) in a pathloss reference RS for PUCCH from a pathloss reference RS-ID for PUCCH (PUCCH-PathlossReferenceRS-Id) having an index 0 in the pathloss reference RS information for PUCCH (PUCCH-PathlossReferenceRS).

First Embodiment

Scheduling of a PUSCH using DCI format 0_0 on a CC having configured PUCCH resources may be supported. A PUCCH resource having the lowest ID among those configured PUCCH resources may not have spatial relation (spatial relation information, PUCCH-SpatialRelationInfo) (configuration of the PUCCH resource having the lowest ID may not be accompanied by spatial relation).

In FR2 and in the RRC connected mode, scheduling of a PUSCH using DCI format 0_0 on a CC having configured PUCCH resources may be supported. A PUCCH resource having the lowest ID among those configured PUCCH resources may not have spatial relation.

In FR2 and in the RRC connected mode, scheduling of a PUSCH using DCI format 0_0 in an active UL BWP of a CC having configured PUCCH resources may be supported. A PUCCH resource having the lowest ID among those configured PUCCH resources in the active UL BWP may not have spatial relation.

A condition for scheduling of a PUSCH using DCI format 0_0 may include a condition satisfied if a pathloss reference RS with respect to this PUSCH is not configured.

Spatial relation for a PUSCH scheduled using DCI format 0_0 may comply with spatial relation or default spatial relation for a PUCCH resource (e.g., a PUCCH resource having the lowest ID). An RS used for pathloss calculation in response to the PUSCH scheduled using DCI format 0_0 may comply with a pathloss reference RS or a default pathloss reference RS with respect to a PUCCH resource (e.g., a PUCCH resource having the lowest ID).

Figure 2:
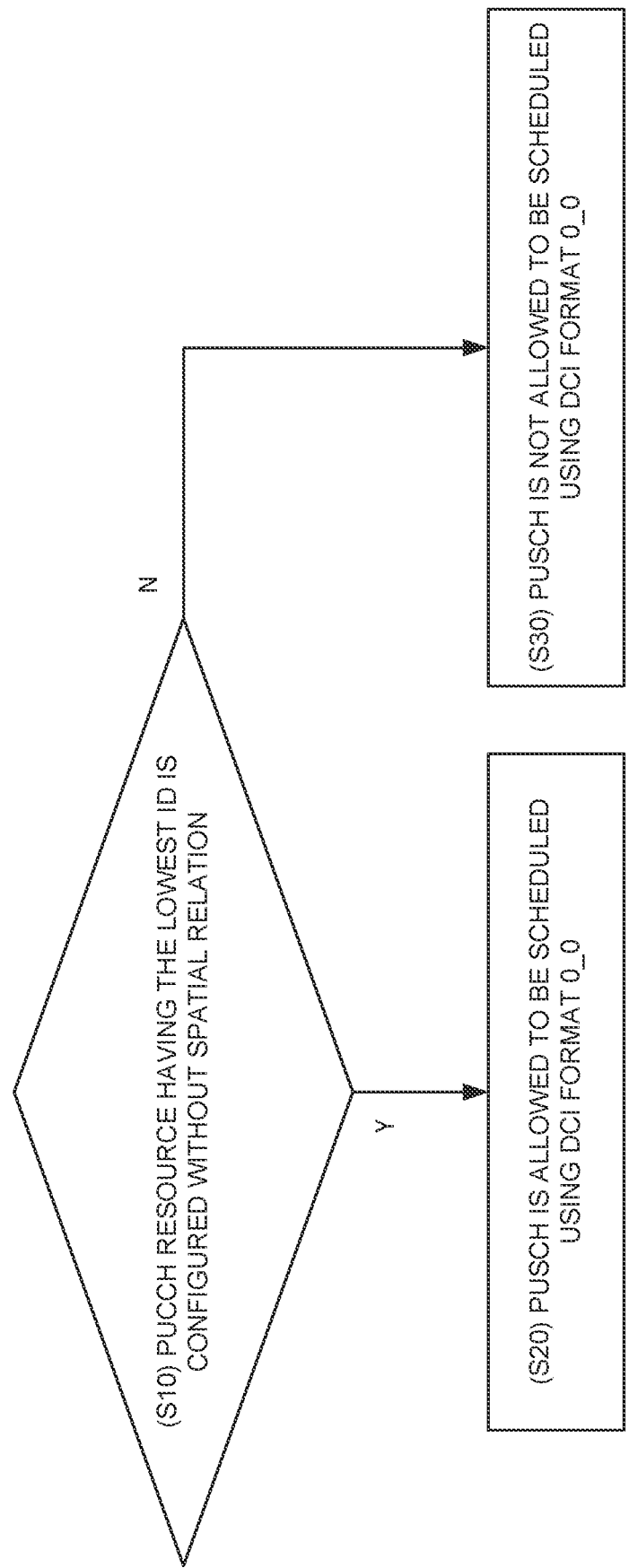
FIG. 2 is a diagram to show an example of operation according to a first embodiment.

As shown in FIG. 2, for example, if a PUCCH resource having the lowest ID is configured without spatial relation information (S10: Y), a PUSCH can be scheduled using DCI format 0_0 (S20). If the PUCCH resource having the lowest ID is not configured without spatial relation information (S10: N), a PUSCH cannot be scheduled using DCI format 0_0 (S30).

Second Embodiment

In the absence of a PUCCH resource configured in an active UL BWP of a CC in FR2 and in the RRC connected mode, default spatial relation of a PUSCH scheduled using DCI format 0_0 and a default pathloss reference RS are supported. This function may be applied to UE to support the function of default spatial relation for a dedicated PUCCH or a dedicated SRS according to Rel. 16, or may be applied to a case where the UE to support the function of default spatial relation for a dedicated PUCCH or a dedicated SRS according to Rel. 16 is configured by a base station.

An RRC parameter for enabling the function of default spatial relation for a dedicated PUCCH or a dedicated SRS may be introduced. The default spatial relation may be a TCI state or QCL assumption of a CORESET having the lowest ID. A default pathloss reference RS may be an RS of the same QCL type D as a TCI state or QCL assumption of the CORESET having the lowest ID. The default pathloss reference RS may be a periodic RS.

Third Embodiment

In FR2 and in the RRC connected mode, scheduling of a PUSCH using DCI format 0_0 in an active UL BWP of a CC having configured PUCCH resources is supported. Here, regarding all the configured PUCCH resources in the active UL BWP, none of these configurations is accompanied by spatial relation.

In response to a PUSCH scheduled using DCI format 0_0, spatial relation and a pathloss reference RS may comply with spatial relation and a pathloss reference RS respectively with respect to the PUCCH resources. In response to the PUSCH scheduled using DCI format 0_0, spatial relation and a pathloss reference RS with respect to a PUCCH resource may be default spatial relation and a default pathloss reference RS respectively with respect to the PUCCH resources.

Fourth Embodiment

Reporting of UE capability information may be done indicating at least one of information showing that UE forms default spatial relation, information showing that the UE supports a default pathloss reference RS, and information showing that the UE supports any of the first to third embodiments. The UE capability information may indicate each of the information showing that the UE forms default spatial relation, the information showing that the UE supports a default pathloss reference RS, and the information showing that the UE supports any of the first to third embodiments. One piece of UE capability information may indicate all of the information showing that the UE forms default spatial relation, the information showing that the UE supports a default pathloss reference RS, and the information showing that the UE supports any of the first to third embodiments.

Fifth Embodiment

If a configured RRC parameter indicates at least one of application of default spatial relation, application of a default pathloss reference RS, and application of operations according to any of the first to third embodiments, UE may perform the configured operation. If this RRC parameter is not configured, the UE may perform operation defined by Rel. 15. The RRC parameter may indicate each of the application of default spatial relation, the application of a default pathloss reference RS, and the application of operations according to any of the first to third embodiments. One RRC parameter may indicate all of the application of default spatial relation, the application of a default pathloss reference RS, and the application of operations according to any of the first to third embodiments.

Sixth Embodiment

An RS used for pathloss calculation (default pathloss reference RS) may be an RS of the QCL type D in an active TCI state having the lowest ID with respect to a PDSCH. Default spatial relation and a default pathloss reference RS may be combined. At least one of the following operations 1 and 2 may be complied with by UE.

<<Operation 1>>

If a pathloss reference RS is not configured by RRC signaling in response to a dedicated PUCCH or a dedicated SRS in FR2, default spatial relation may comply with the following.

In a case where a CORESET is configured on a CC, default spatial relation may be a TCI state or QCL assumption of a CORESET having the lowest ID. An RS used for pathloss calculation may be an RS of the same QCL type D as a TCI state or QCL assumption of the CORESET having the lowest ID. The RS used for the pathloss calculation may be a periodic RS.

In a case where no CORESET is configured on a CC, the default spatial relation may be an activated TCI state having the lowest ID applicable to a PDSCH in an active DL-BWP of this CC.

An RS used for pathloss calculation may be an RS of the QCL type D in an active TCI state having the lowest ID with respect to a PDSCH.

<<Operation 2>>

If a pathloss reference RS is configured by RRC signaling in response to a dedicated PUCCH or a dedicated SRS in FR2, default spatial relation may comply with the following.

In a case where a CORESET is configured on a CC, default spatial relation may be a TCI state or QCL assumption of a CORESET having the lowest ID. An RS used for pathloss calculation may be an RS of the same QCL type D as a TCI state or QCL assumption of the CORESET having the lowest ID, or may be a configured or activated pathloss reference RS. The RS used for the pathloss calculation may be a periodic RS.

In a case where no CORESET is configured on a CC, default spatial relation may be an activated TCI state having the lowest ID applicable to a PDSCH in an active DL-BWP of this CC.

An RS used for pathloss calculation may be an RS of the QCL type D in an active TCI state having the lowest ID with respect to the PDSCH, or may be a configured or activated pathloss reference RS.

Figure 3:
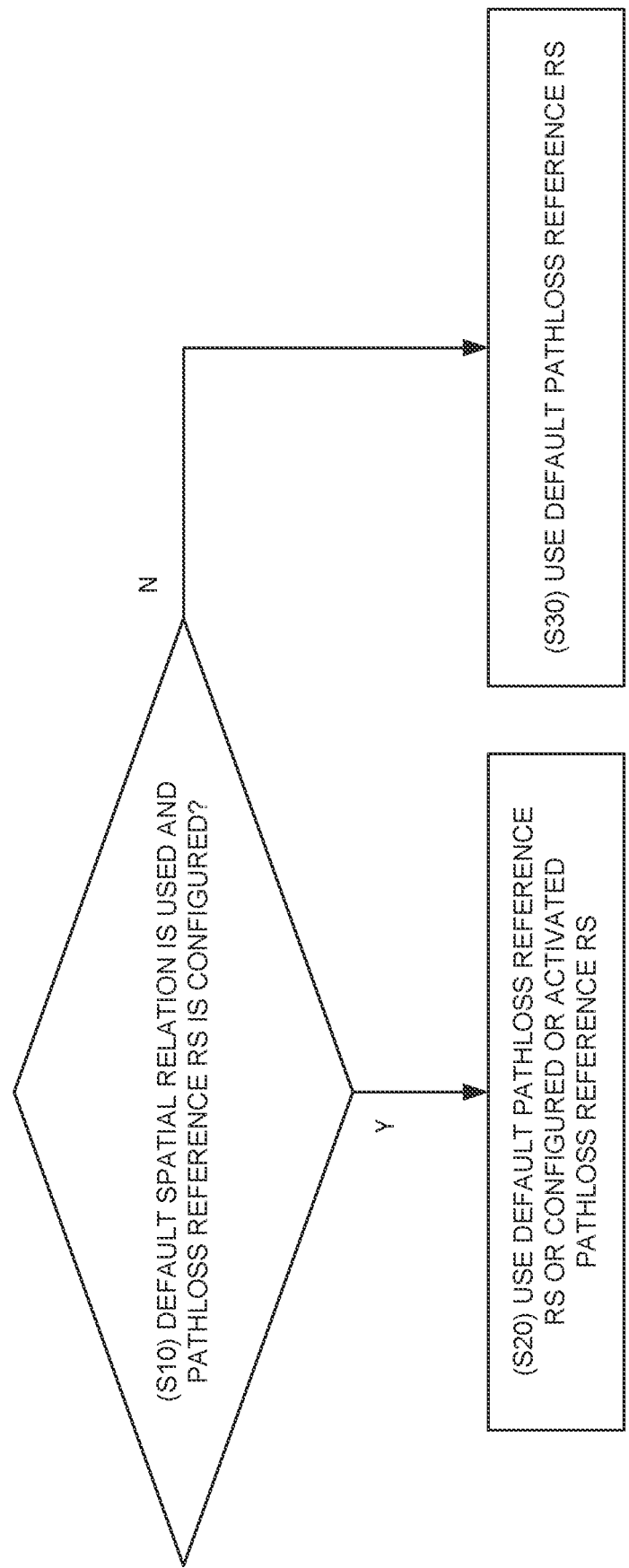
FIG. 3 is a diagram to show an example of operation according to a sixth embodiment.

As shown in FIG. 3, for example, if UE uses default spatial relation in response to a dedicated PUCCH or a dedicated SRS in FR2 and if a pathloss reference RS is configured (S10: Y), the UE uses a default pathloss reference RS or a configured or activated pathloss reference RS (S20). If the UE uses the default spatial relation in response to the dedicated PUCCH or the dedicated SRS in FR2 and if a pathloss reference RS is not configured (S10: N), the UE uses the default pathloss reference RS (S30).

Seventh Embodiment

On the basis of whether at least one of spatial relation and a pathloss reference RS of an SRS resource indicated by an SRI for a PUSCH is configured, UE may determine at least one of default spatial relation and a default pathloss reference RS with respect to an SRS, and apply at least one of the determined default spatial relation and default pathloss reference RS to the PUSCH. Determination of at least one of the default spatial relation and the default pathloss reference RS with respect to the SRS may comply with the above-described determination method (e.g., the method according to at least one of the first to sixth embodiments). The UE may comply with at least one of the following operations 1, 2, 3, and 4.

<<Operation 1>>

In a case where a PUSCH is scheduled using DCI format 0_1, spatial relation is not configured in response to an SRS resource indicated by an SRI, and a pathloss reference RS is configured in FR2, if a CORESET is configured on a corresponding CC, default spatial relation for this PUSCH may be a TCI state or QCL assumption of a CORESET having the lowest ID. In this case, an RS used for pathloss calculation with respect to this PUSCH may be an RS of the same QCL type D as a TCI state or QCL assumption of the CORESET having the lowest ID, or may be a configured or activated pathloss reference RS. The RS used for the pathloss calculation may be a periodic RS.

In this case, if no CORESET is configured on this CC, default spatial relation for this PUSCH may be an activated TCI state having the lowest ID applicable to a PDSCH in an active DL-BWP of this CC. In this case, the RS used for the pathloss calculation with respect to this PUSCH may be an RS of the QCL type D in an active TCI state having the lowest ID with respect to the PDSCH, or may be a configured or activated pathloss reference RS. The RS used for the pathloss calculation may be a periodic RS.

<<Operation 2>>

In a case where a PUSCH is scheduled using DCI format 0_1, spatial relation is not configured in response to an SRS resource indicated by an SRI, and a pathloss reference RS is not configured in FR2, if a CORESET is configured on a corresponding CC, default spatial relation for this PUSCH may be a TCI state or QCL assumption of the CORESET having the lowest ID. In this case, an RS used for pathloss calculation with respect to this PUSCH may be an RS of the same QCL type D as a TCI state or QCL assumption of the CORESET having the lowest ID. The RS used for the pathloss calculation may be a periodic RS.

In this case, if no CORESET is configured on this CC, default spatial relation for this PUSCH may be an activated TCI state having the lowest ID applicable to a PDSCH in an active DL-BWP of this CC. In this case, the RS used for the pathloss calculation with respect to this PUSCH may be an RS of the QCL type D in an active TCI state having the lowest ID with respect to the PDSCH. The RS used for the pathloss calculation may be a periodic RS.

<<Operation 3>>

In a case where a PUSCH is scheduled using DCI format 0_1, spatial relation is not configured in response to an SRS resource indicated by an SRI, and a pathloss reference RS is not configured in FR2, if a CORESET is configured on a corresponding CC, default spatial relation for this PUSCH may be a TCI state or QCL assumption of a CORESET having the lowest ID. In this case, an RS used for pathloss calculation with respect to this PUSCH may be an RS of the same QCL type D as a TCI state or QCL assumption of the CORESET having the lowest ID, or may be a configured or activated pathloss reference RS. The RS used for the pathloss calculation may be a periodic RS.

In this case, if no CORESET is configured on this CC, default spatial relation for this PUSCH may be an activated TCI state having the lowest ID applicable to a PDSCH in an active DL-BWP of this CC. In this case, the RS used for the pathloss calculation with respect to this PUSCH may be an RS of the QCL type D in an active TCI state having the lowest ID with respect to the PDSCH, or may be a configured or activated pathloss reference RS. The RS used for the pathloss calculation may be a periodic RS.

<<Operation 4>>

In a case where a PUSCH is scheduled using DCI format 0_1, spatial relation is not configured in response to an SRS resource indicated by an SRI, and a pathloss reference RS is configured in FR2, if a CORESET is configured on a corresponding CC, default spatial relation for this PUSCH may be a TCI state or QCL assumption of a CORESET having the lowest ID. In this case, an RS used for pathloss calculation with respect to this PUSCH may be an RS of the same QCL type D as a TCI state or QCL assumption of the CORESET having the lowest ID. The RS used for the pathloss calculation may be a periodic RS.

In this case, if no CORESET is configured on this CC, default spatial relation for this PUSCH may be an activated TCI state having the lowest ID applicable to a PDSCH in an active DL-BWP of this CC. In this case, the RS used for the pathloss calculation with respect to this PUSCH may be an RS of the QCL type D in an active TCI state having the lowest ID with respect to the PDSCH. The RS used for the pathloss calculation may be a periodic RS.

The PUSCH scheduled using DCI format 0_1 differs in the size of an SRI field (the number of bits) in response to the number of SRS resources in an SRS resource set configured to be used for codebook base transmission or for non-codebook base transmission. For example, if there is one SRS resource, the size of the SRI field is 0 bit, and if the number of SRS resources is two, the size of the SRI field is 1 bit. The above-described expression "an SRS resource indicated by an SRS" may include an SRS resource while the number of SRS resources is 1 (only one SRS resource in an SRS resource set configured to be used for codebook base transmission or for non-codebook base transmission).

(Radio Communication System)

Hereinafter, a structure of a radio communication system according to one embodiment of the present disclosure will be described. In this radio communication system, the radio communication methods according to respective embodiments of the present disclosure described above may be used alone or may be used in combination for making communication.

Figure 4:
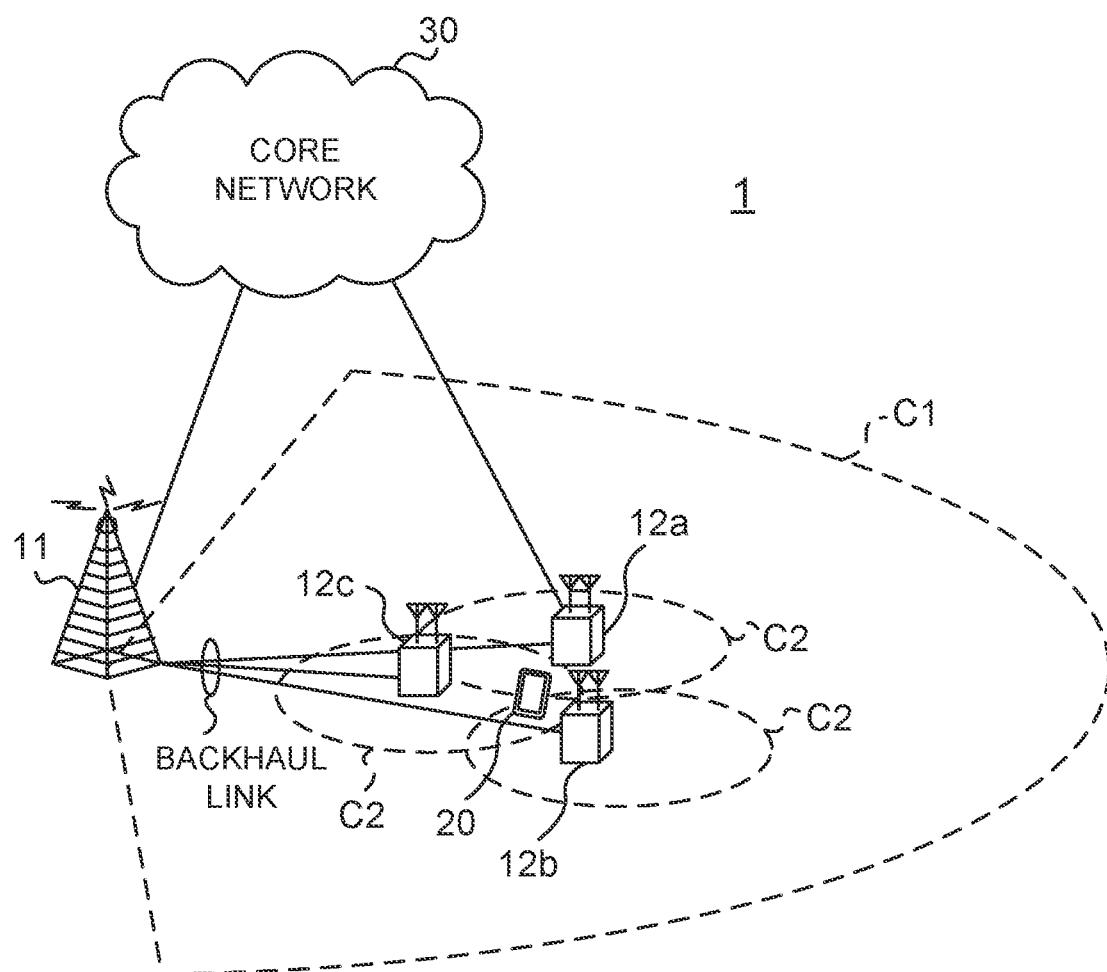
FIG. 4 is a diagram to show an example of a schematic structure of a radio communication system according to one embodiment.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (Evolved Universal Terrestrial Radio Access (E-UTRA)-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (SGCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
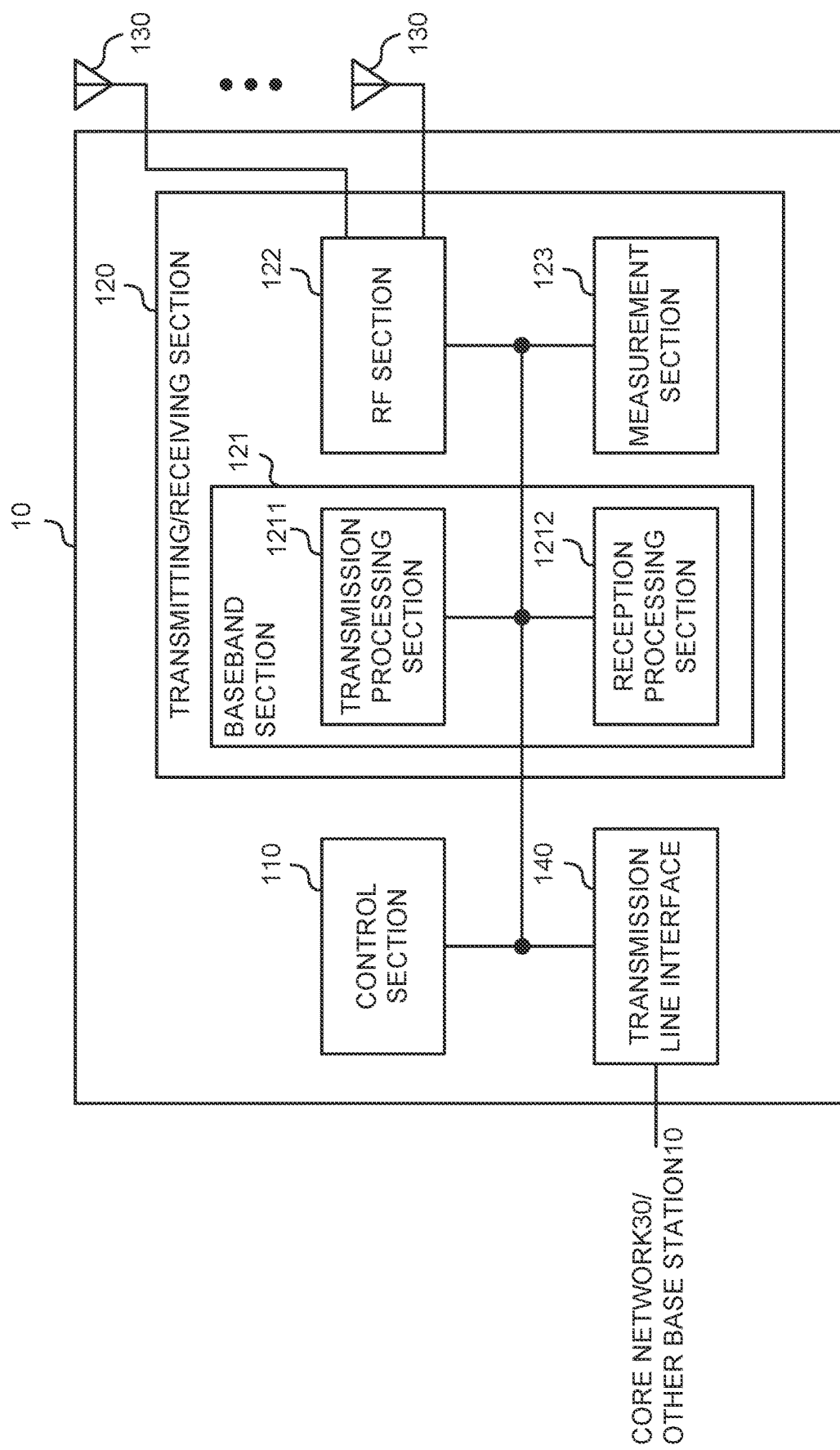
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

(User Terminal)

Figure 6:
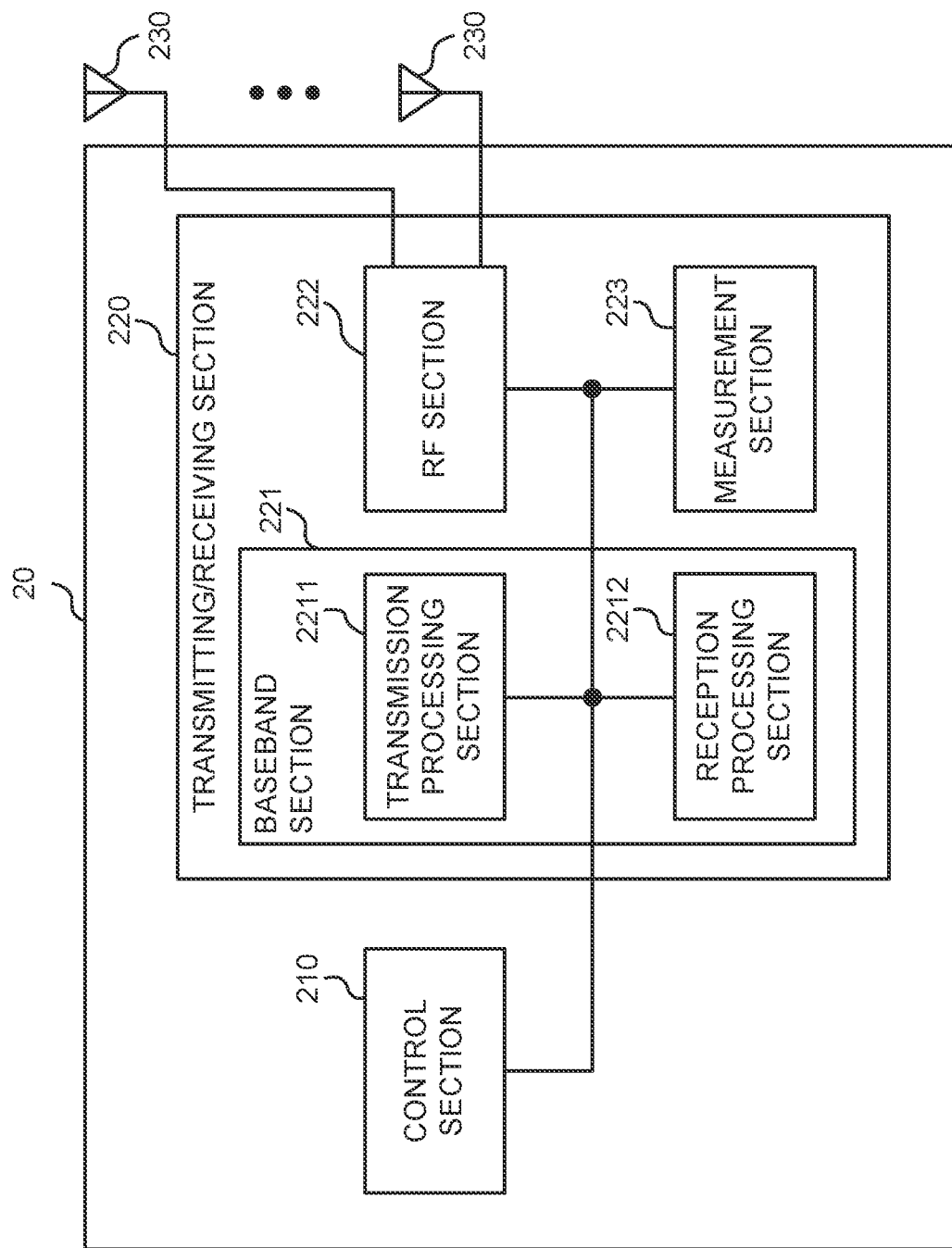
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive configuration information not including spatial relation information and indicating a physical uplink control channel (PUCCH) resource having the lowest ID. The control section 210 may control reception of a physical uplink shared channel (PUSCH) scheduled using downlink control information (DCI) format 0_0.

The transmitting/receiving section 220 may receive the DCI format 0_0 in a frequency range (FR) 2 and in a radio resource control (RRC) connected mode.

The transmitting/receiving section 220 may receive the DCI format 0_0 in an active uplink bandwidth part (BWP) configured with the PUCCH resource.

The transmitting/receiving section 220 may receive configuration information on uplink transmission of one of a physical uplink control channel (PUCCH) and a sounding reference signal (SRS). The configuration information may not include spatial relation information and information on a reference signal for pathloss reference. The control section 210 may use a reference signal in an active transmission control indication (TCI) state having the lowest ID with respect to a physical downlink shared channel (PDSCH) for pathloss calculation for the uplink transmission.

The reference signal may be used for pathloss calculation for a physical uplink shared channel (PUSCH).

The reference signal may be a quasi-co-location (QCL) type D.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
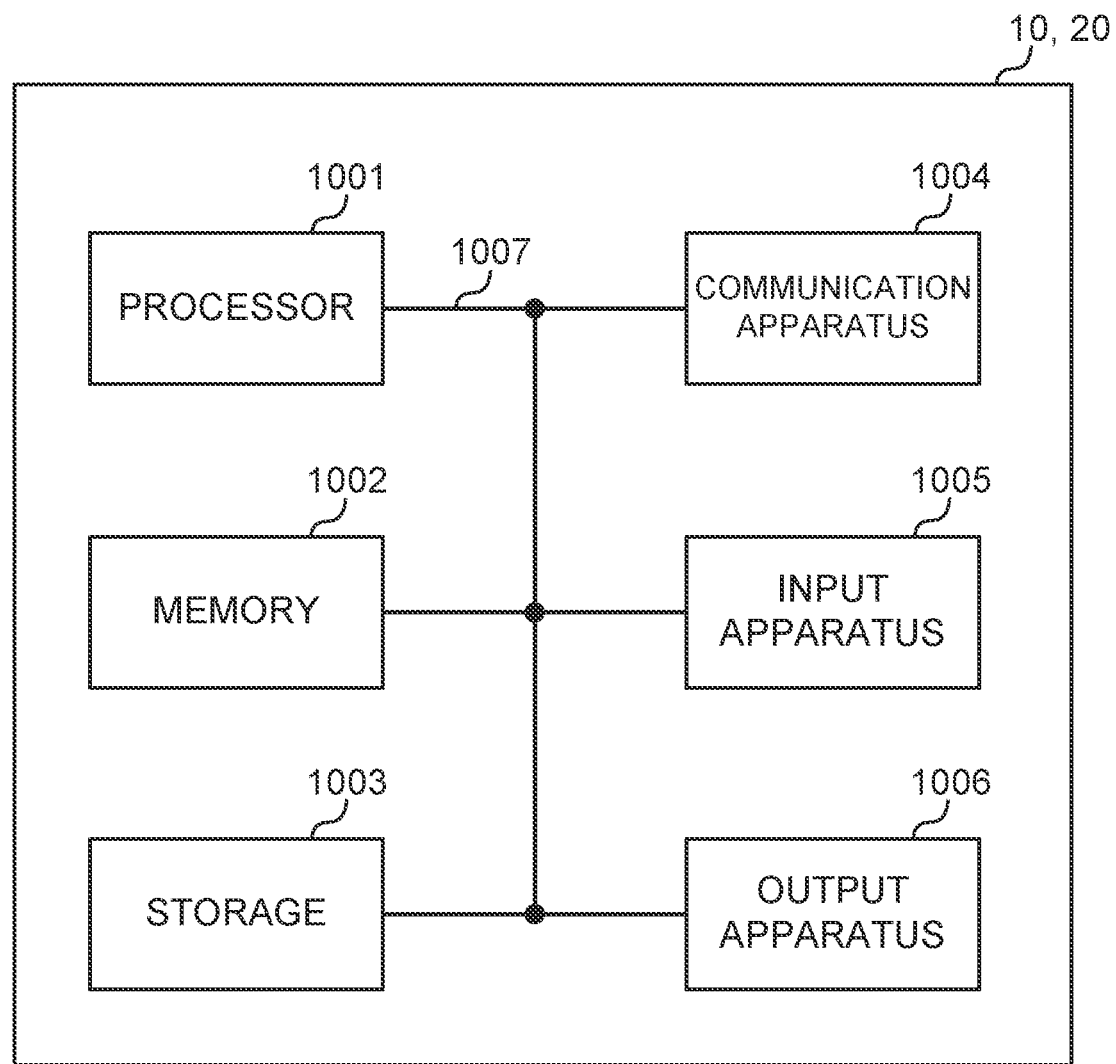
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section

120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used dedicatedly or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The present application is based on Japanese Patent Application No. 2019-210877 filed on Nov. 21, 2019. The content of which is incorporated herein in its entirety.

What is claimed is:

1. A terminal comprising:
a receiver that receives information regarding one or more transmission control indication (TCI) states for a physical downlink shared channel (PDSCH); and
a processor that, when a reference signal for pathloss estimate for a sounding reference signal (SRS) is not configured, spatial relation information for the SRS is not configured, and a control resource set is not configured in an active downlink bandwidth part (BWP) of a cell for the SRS, estimates the pathloss based on an active TCI state corresponding to a lowest ID among the one or more TCI states,
wherein when the reference signal is not configured, the spatial relation information is not configured, and a control resource set is not configured in the active downlink BWP, the processor estimates the pathloss based on a periodic reference signal of a specific quasi co-location (QCL) type in the active TCI state.

2. A radio communication method for a terminal, comprising:
receiving information regarding one or more transmission control indication (TCI) states for a physical downlink shared channel (PDSCH); and
when a reference signal for pathloss estimate for a sounding reference signal (SRS) is not configured, spatial relation information for the SRS is not configured, and a control resource set is not configured in an active downlink bandwidth part (BWP) of a cell for the SRS, estimating the pathloss based on an active TCI state corresponding to a lowest ID among the one or more TCI states,
wherein when the reference signal is not configured, the spatial relation information is not configured, and a control resource set is not configured in the active downlink BWP, the pathloss is estimated based on a periodic reference signal of a specific quasi co-location (QCL) type in the active TCI state.

3. A base station comprising:
a transmitter that transmits information regarding one or more transmission control indication (TCI) states for a physical downlink shared channel (PDSCH); and
a processor that, when a reference signal for pathloss estimate for a sounding reference signal (SRS) is not configured, spatial relation information for the SRS is not configured, and a control resource set is not configured in an active downlink bandwidth part (BWP) of a cell for the SRS, controls, based on an active TCI state corresponding to a lowest ID among the one or more TCI states, reception of the SRS transmitted by using the pathloss,
wherein when the reference signal is not configured, the spatial relation information is not configured, and a control resource set is not configured in the active downlink BWP, the processor controls the reception of the SRS transmitted by using the pathloss based on a periodic reference signal of a specific quasi co-location (QCL) type in the active TCI state.

4. A system comprising a terminal and a base station, wherein
the terminal comprises:
a receiver that receives information regarding one or more transmission control indication (TCI) states for a physical downlink shared channel (PDSCH); and
a processor that, when a reference signal for pathloss estimate for a sounding reference signal (SRS) is not configured, spatial relation information for the SRS is not configured, and a control resource set is not configured in an active downlink bandwidth part (BWP) of a cell for the SRS, estimates the pathloss based on an active TCI state corresponding to a lowest ID among the one or more TCI states,
wherein when the reference signal is not configured, the spatial relation information is not configured, and a control resource set is not configured in the active downlink BWP, the processor estimates the pathloss based on a periodic reference signal of a specific quasi co-location (QCL) type in the active TCI state, and
the base station comprises:
a transmitter that transmits, to the terminal, the information regarding the one or more TCI states.

* * * * *